US011966293B2

(12) United States Patent
Masson et al.

(10) Patent No.: US 11,966,293 B2
(45) Date of Patent: Apr. 23, 2024

(54) TECHNIQUES FOR TRIAL-AND-ERROR LEARNING IN COMPLEX APPLICATION ENVIRONMENTS

(71) Applicant: AUTODESK, INC., San Francisco, CA (US)

(72) Inventors: Damien Paul Andre Masson, Waterloo (CA); Jo Karel Vermeulen, East York (CA); George Fitzmaurice, Toronto (CA); Justin Frank Matejka, Newmarket (CA)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 17/965,718

(22) Filed: Oct. 13, 2022

(65) Prior Publication Data
US 2023/0289261 A1 Sep. 14, 2023

Related U.S. Application Data

(60) Provisional application No. 63/319,216, filed on Mar. 11, 2022.

(51) Int. Cl.
*G06F 11/14* (2006.01)
*G06F 3/0482* (2013.01)
*G06F 3/0484* (2022.01)
*G06F 9/38* (2018.01)
*G06F 9/451* (2018.01)
(Continued)

(52) U.S. Cl.
CPC ........ *G06F 11/1407* (2013.01); *G06F 3/0482* (2013.01); *G06F 3/0484* (2013.01); *G06F 9/3836* (2013.01); *G06F 9/453* (2018.02); *G06F 9/4881* (2013.01); *G06F 11/1451* (2013.01);
(Continued)

(58) Field of Classification Search
CPC ............. G06F 11/1407; G06F 11/1451; G06F 11/1469; G06F 3/0482; G06F 3/0484; G06F 9/453
See application file for complete search history.

(56) References Cited

U.S. PATENT DOCUMENTS 5,235,679 A 8/1993 Yoshizawa et al.
5,513,308 A 4/1996 Mori
(Continued)

OTHER PUBLICATIONS

Final Office Action received for U.S. Appl. No. 17/965,717 dated Jun. 26, 2023, 13 pages.
(Continued)

*Primary Examiner* — Nadeem Iqbal
(74) *Attorney, Agent, or Firm* — Artegis Law Group, LLP

(57) ABSTRACT

One embodiment of a computer-implemented method for automatically generating command recommendations for a software workflow comprises identifying a plurality of command sequences stored in a database based on a current command being interacted with in a graphical user interface; computing a score for each command sequence included in the plurality of command sequences based on one or more commands included in the command sequence and one or more commands included in a command history; determining at least one command sequence included in the plurality of command sequences to output based on the scores; and outputting the at least one command sequence for display.

20 Claims, 19 Drawing Sheets

(51) Int. Cl.
  *G06F 9/48* (2006.01)
  *G09B 19/00* (2006.01)
(52) U.S. Cl.
  CPC ...... *G06F 11/1469* (2013.01); *G09B 19/0053* (2013.01)

(56) References Cited

U.S. PATENT DOCUMENTS

| | | | |
|---|---|---|---|
| 6,020,886 | A | 2/2000 | Jacober et al. |
| 9,569,231 | B2 | 2/2017 | Butin et al. |
| 10,725,800 | B2* | 7/2020 | Sawal ............. G06F 9/453 |
| 11,216,531 | B2* | 1/2022 | Clarke ............ G06F 11/3438 |
| 2007/0089098 | A1 | 4/2007 | Nickell et al. |

OTHER PUBLICATIONS

Andrade et al., "The Macro-structure of Use of Help", In Proceedings of the 27th ACM International Conference on Design of Communication—SIGDOC '09, https://doi.org/10.1145/1621995.1622022, Oct. 2009, pp. 143-150.
Autodesk, "Autodesk Screencast", Retrieved from https://knowledge.autodesk.com/community/screencast, 2021, 4 pages.
Blattner et al., "Earcons and Icons: Their Structure and Common Design Principles", https://doi.org/10.1145/67880.1046599, SIGCHI Bull. vol. 21, No. 1, Jul. 1989, 1 page.
Carroll et al., "Training Wheels in a User Interface", https://doi.org/10.1145/358198.358218, Communications of the ACM, vol. 27, No. 8, Aug. 1984, pp. 800-806.
Carroll et al., "Paradox of the Active User", In Interfacing Thought: Cognitive Aspects of Human-Computer Interaction, 1987, pp. 80-111.
Cockburn et al., "Supporting Novice to Expert Transitions in User Interfaces", https://doi.org/10.1145/2659796, ACM Computing Surveys, vol. 47, No. 2, Article 31, Nov. 2014, 36 pages.
Mul et al., "Learning user interfaces by exploration", https://doi.org/10.1016/0001-6918(95)00060-7, Acta Psychologica, vol. 91, No. 3, Apr. 1996, pp. 325-344.
Draper et al., "Learning by Exploration and Affordance Bugs", https://doi.org/10.1145/259964.260084, Association for Computing Machinery, 1993, pp. 75-76.
Findlater et al., "A Comparison of Static, Adaptive, and Adaptable Menus", In Proceedings of the 2004 Conference on Human Factors in Computing Systems, https://doi.org/10.1145/985692.985704, vol. 6, No. 1, Apr. 24-29, 2004, pp. 89-96.
Findlater et al., "Ephemeral Adaptation: The Use of Gradual Onset to Improve Menu Selection Performance", In Proceedings of the SIGCHI Conference on Human Factors in Computing Systems, https://doi.org/10.1145/1518701.1518956, 2009, 10 pages.
Fraser et al., "DiscoverySpace: Suggesting Actions in Complex Software", In Proceedings of the 2016 ACM Conference on Designing Interactive Systems, https://doi.org/10.1145/2901790.2901849, 2016, pp. 1221-1232.
Fraser et al., "ReMap: Lowering the Barrier to Help-Seeking with Multimodal Search", http://dx.doi.org/10.1145/3379337.3415592, Oct. 20-23, 2020, 8 pages.
Grossman et al., "ToolClips: An Investigation of Contextual Video Assistance for Functionality Understanding", https://doi.org/10.1145/1753326.1753552, Apr. 10-15, 2010, pp. 1515-1524.
Grossman et al., "A Survey of Software Learnability: Metrics, Methodologies and Guidelines", In Proceedings of the SIGCHI Conference on Human Factors in Computing Systems. Association for Computing Machinery, https://doi.org/10.1145/1518701.1518803, Apr. 4-9, 2009, pp. 649-658.
Kaul, Pushkar N., "Drug Discovery: Past, Present and Future", https://doi.org/10.1007/978-3-0348-8833-2_1, vol. 50, 1998, 97 pages.
Kelleher et al., "Stencils-Based Tutorials: Design and Evaluation", In Proceedings of the SIGCHI Conference on Human Factors in Computing Systems, https://doi.org/10.1145/1054972.1055047, Apr. 2-7, 2005, pp. 541-550.

Kiani et al., "Beyond "One-Size-Fits-All": Understanding the Diversity in How Software Newcomers Discover and Make Use of Help Resources", https://doi.org/10.1145/3290605.3300570, May 4-9, 2019, 14 pages.
Lafreniere et al., "Task-Centric Interfaces for Feature-Rich Software", http://dx.doi.org/10.1145/2686612.2686620, Dec. 2-5, 2014, pp. 49-58.
Afreniere et al., "These Aren't the Commands You're Looking For: Addressing False Feedforward in Feature-Rich Software", In Proceedings of the 28th Annual ACM Symposium on User Interface Software & Technology, https://doi.org/10.1145/2807442.2807482, Nov. 8-11, 2015, pp. 619-628.
Linton et al., "OWL: A Recommender System for Organization-Wide Learning", Technical Report WS-98-08, AAAI, 1998, pp. 65-69.
Linton et al., "Recommender Systems for Learning: Building User and Expert Models through Long-Term Observation of Application Use", https://doi.org/10.1023/A:1026521931194, User Modeling and User-Adapted Interaction vol. 10, No. 2, Jun. 2000, pp. 181-207.
Lunzer, Aran, "Towards The Subjunctive Interface: General Support For Parameter Exploration By Overlaying Alternative Application States", vol. 98, 1998, 4 pages.
Lunzer et al., "Subjunctive Interfaces: Extending Applications to Support Parallel Setup, Viewing and Control of Alternative Scenarios", https://doi.org/10.1145/1314683.1314685, vol. 14, No. 4, Article 17, Jan. 2008, pp. 17:1-17:44.
Mahmud et al., "Learning Through Exploration: How Children, Adults, and Older Adults Interact with a New Feature-Rich Application", https://doi.org/10.1145/3313831.3376414, Apr. 25-30, 2020, 14 pages.
Matejka et al., "Ambient Help", In Proceedings of the SIGCHI Conference on Human Factors in Computing Systems. Association for Computing Machinery, https://doi.org/10.1145/1978942.1979349, May 7-12, 2011, pp. 2751-2760.
Matejka et al., "Patina: Dynamic Heatmaps for Visualizing Application Usage", https://doi.org/10.1145/2470654.2466442, In Proceedings of the SIGCHI Conference on Human Factors in Computing Systems, Apr. 27-May 2, 2013, pp. 3227-3236.
Matejka et al., "CommunityCommands: Command Recommendations for Software Applications", https://doi.org/10.1145/1622176.1622214, In Proceedings of the 22nd Annual ACM Symposium on User Interface Software and Technology—UIST '09, Oct. 4-7, 2009, pp. 193-202.
Nancel et al., "Causality—A Conceptual Model of Interaction History", https://doi.org/10.1145/2556288.2556990, In Proceedings of the SIGCHI Conference on Human Factors in Computing Systems, Apr. 26-May 1, 2014, pp. 1777-1786.
Novick et al., "The Micro-Structure of Use of Help", In Proceedings of the 27th ACM International Conference on Design of Communication—SIGDOC '09, https://doi.org/10.1145/1621995.1622014, Oct. 5-7, 2009, pp. 97-104.
Polson et al., "Theory-Based Design for Easily Learned Interfaces", https://doi.org/10.1080/07370024.1990.9667154, Human-Computer Interaction, vol. 5, Jun. 1990, pp. 191-220.
Pongnumkul et al., "Pause-and-Play: Automatically Linking Screencast Video Tutorials with Applications", In Proceedings of the 24th Annual ACM Symposium on User Interface Software and Technology, https://doi.org/10.1145/2047196.2047213, Oct. 16-19, 2011, pp. 135-144.
Prakash et al., "A Framework for Undoing Actions in Collaborative Systems", ACM Transactions on Computer-Human Interaction (TOCHI), https://doi.org/10.1145/198425.198427, vol. 1, No. 4, Dec. 1994, pp. 295-330.
Rieman, John, "A Field Study of Exploratory Learning Strategies", ACM Transactions on Computer-Human Interaction, https://doi.org/10.1145/234526.234527, vol. 3 No. 3, Sep. 1996, pp. 189-218.
Sears et al., "Split Menus: Effectively Using Selection Frequency to Organize Menus", ACM Transactions on Computer-Human Interaction, https://doi.org/10.1145/174630.174632, vol. 1, No. 1, Mar. 1994, pp. 27-51.
Shneiderman, Ben, "Direct Manipulation: A Step Beyond Programming Languages", https://doi.org/10.1145/174630.174632, vol. 16, No. 8, Aug. 1983, pp. 57-69.

(56) References Cited

OTHER PUBLICATIONS

Simon et al., "Trial and Error Search in Solving Difficult Problems: Evidence from the Game of Chess", https://doi.org/10.1002/bs.3830070402, vol. 7, No. 4, 1962, pp. 425-429.

Terry et al., "Side Views: Persistent, On-Demand Previews for Open-Ended Tasks", https://doi.org/10.1145/571985.571996, vol. 4, Issue 2, 2002, pp. 71-80.

Terry et al., "Variation in Element and Action: Supporting Simultaneous Development of Alternative Solutions", In Proceedings of the SIGCHI Conference on Human Factors in Computing Systems, https://doi.org/10.1145/985692.985782, vol. 6, No. 1, Apr. 24-29, 2004, pp. 711-718.

Dam, Andries Van, "Post-WIMP User Interfaces", Communications of the ACM, https://doi.org/10.1145/253671.253708, vol. 40, No. 2, Feb. 1997, pp. 63-67.

Willett et al., "Scented Widgets: Improving Navigation Cues with Embedded Visualizations", In Proc. of the SIGCHI Conference on Human Factors in Computing Systems, vol. 9, 2007, 8 pages.

Non Final Office Action received for U.S. Appl. No. 17/965,717 dated Mar. 1, 2023, 19 pages.

Non Final Office Action received for U.S. Appl. No. 17/965,717 dated Dec. 22, 2023, 15 pages.

\* cited by examiner

COMMAND SEQUENCE SAMPLE CALCULATION

1700

CURRENTLY EXPLORED COMMAND 1502

| 2 |
|---|

EXAMPLE COMMAND SEQUENCES 1706

|            |   |   |   |   |   |   |
|------------|---|---|---|---|---|---|
| SEQUENCE 1 | 1 | 2 | 3 | 4 | 4 | 8 |
| SEQUENCE 2 | 2 | 4 | 5 | 4 | 6 | 4 |
| SEQUENCE 3 | 4 | 2 | 3 |   |   |   |
| SEQUENCE 4 | 1 | 2 | 7 | 6 |   |   |

INTERMEDIATE COMPUTATIONS 1708

| COMMAND ID              | 1    | 2    | 3    | 4    | 5    | 6    | 7    | 8    |
|-------------------------|------|------|------|------|------|------|------|------|
| OCCURANCES 1710         | 2    | 4    | 2    | 5    | 1    | 3    | 1    | 1    |
| INVERSE REFQUENCY 1712  | 0.11 | 0.21 | 0.11 | 0.26 | 0.05 | 0.16 | 0.05 | 0.05 |

SUM OF OCCURRENCES 1714

| 19 |
|----|

EXECUTION HISTORY 720

| COMMAND ID 706 |
|---|
| 3 |
| 2 |
| 4 |
| 1 |
| 5 |
| 3 |
| 1 |
| 3 |
| 5 |
| 4 |

MOST RECENT COMMANDS 1704

SCORING TECHNIQUES 1716

|                  | TECHNIQUE 1 1720 | TECHNIQUE 2 1722 |
|------------------|------------------|------------------|
| SEQUENCE 1 SCORE | 0.68             | 0.05             |
| SEQUENCE 2 SCORE | 0.53             | 0.21             |
| SEQUENCE 3 SCORE | 0.58             | 0.00             |
| SEQUENCE 4 SCORE | 0.32             | 0.21             |

SEQUENCE SCORES 1718

FIG. 17

TECHNIQUES FOR TRIAL-AND-ERROR LEARNING IN COMPLEX APPLICATION ENVIRONMENTS

CROSS-REFERENCE TO RELATED APPLICATIONS

This application claims the priority benefit of United States provisional patent application titled, "SUPER-CHARGING TRIAL-AND-ERROR FOR LEARNING COMPLEX SOFTWARE APPLICATIONS," filed on Mar. 11, 2022 and having Ser. No. 63/319,216. The subject matter of this related application is hereby incorporated herein by reference.

BACKGROUND

Field of the Various Embodiments

Embodiments of the present disclosure relate generally to techniques for learning new software applications.

Description of the Related Art

Modern software applications oftentimes are large and complex and typically become more so with every new release. Many commercially available software applications include hundreds of thousands if not millions of lines of code. For example, some computer-aided design (CAD) applications include upwards of fourteen million lines of code, and some suites of applications include upwards of forty-four million lines of code.

One issue frequently encountered with software applications, especially complex software applications, is that almost all software applications are designed for experienced users, as opposed to novice users. Accordingly, when a given software application is designed and rolled out to users, a certain base level of knowledge and understanding about how the software application works and how to use the software application is assumed. Novice users and users who are less familiar with the various features and functions of a given software application typically have to read books or instruction manuals, take tutorial classes, and/or watch instructional videos to learn all of the "ins-and-outs" of a software application and how to use the software application. This type of learning regime, however, is at odds with the way most users behave when trying to learn how to use a software application. For various reasons, most users prefer to "click around" a software application in a "trial-and-error" fashion to figure out how to use the different features and functions of the software application.

In an effort to help novice and more inexperienced users, many software applications include help features, such as "tooltips" and tutorials, that either provide information about the different features and functions of a given software application and how those features and functions can be used or show how the different features and functions of a given software application can be used. One drawback of these types of help features, though, is that some of these help features do nothing more than provide information to the user, without providing the user with any opportunity to interact with the software application on a "trial-and-error" basis. As discussed above, most users prefer "trail-and-error" interaction with a software application when learning how to use the software application. Thus, for many users, conventional help features are no better than reading books or users manuals. Another drawback of conventional help features is that, to the extent an opportunity to interact with the software application is provided to the user (as in the case of a short, step-by-step tutorial, for example), that interaction usually is limited to a predetermined set of operations or workflow. Consequently, even though the user some level of interaction with the software application, that interaction typically is unrelated to the current workflow of the user and, therefore, lacks context. Without meaningful context, the likelihood of the user learning and successfully applying the relevant set of operations to his/her current workflow is substantially reduced. Further, forcing a user to leave his/her current workflow to practice using a software application on a different, unrelated workflow can be quite disruptive to the user.

As the foregoing illustrates, what is needed are more effective techniques for teaching users how to use complex software applications.

SUMMARY

One embodiment of the present disclosure sets forth a computer-implemented method for automatically tracking how extensively software application commands have been investigated. The method includes identifying an interaction with a first command occurring within a graphical user interface, where the first command is associated with one or more command parameters. The method further includes updating a command history associated with the first command based on the interaction with the first command. In addition, the method includes computing a progress level associated with the first command based on the command history, where the progress level indicates how many command parameters included in the one or more command parameters have been modified. The method further includes determining a coverage level associated with the first command based on the command history, and outputting at least one of the use level or the progress level for display in the graphical user interface.

One embodiment of the present disclosure sets forth a computer-implemented method for executing software application commands on practice data. The method includes identifying a command demonstration that is stored in a database based on a current command being interacted with in a graphical user interface, wherein the command demonstration is associated with sample application data. The method further includes receiving a selection of whether to execute the command demonstration on the sample application data or current application data. In addition, the method includes causing the command demonstration to be executed on either the sample application data or a copy of current application data to generate modified data, and causing the modified data to be output within the graphical user interface.

One embodiment of the present disclosure sets forth a computer-implemented method for automatically generating command recommendations for a software workflow. The method includes identifying a plurality of command sequences stored in a database based on a current command being interacted with in a graphical user interface. The method further includes computing a score for each command sequence included in the plurality of command sequences based on one or more commands included in the command sequence and one or more commands included in a command history. In addition, the method includes determining at least one command sequence included in the plurality of command sequences to output based on the scores, and outputting the at least one command sequence for display.

At least one technical advantage of the disclosed techniques relative to the prior art is that the disclosed techniques provide a user of a software application with several ways to interact with the software application on a "trial-and-error" basis when learning how to use the different features and functions of the software application. In this regard, the disclosed techniques enable command usage tracking, which allows a user of a software application to keep track of the commands that he/she has already used and explored as well as overall learning progress. The disclosed techniques also enable a user of a software application to select and use previously-implemented sequences of commands on a current workflow, which helps the user better understand which commands should be used in combination within one another and the order in which those commands should be executed. Another technical advantage of the disclosed techniques is that the disclosed techniques provide a user of a software application with a way to execute commands on a copy of the data associated with his/her current workflow or on sample data. Thus, the user can practice using the features and functions of the software application on a "trial-and-error" basis and on contextually-relevant data, which provides the user with a richer and enhanced learning experience relative to what can be achieved with conventional help features. The technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 17 is an exemplary illustration of how command sequences are scored, according to various embodiments;

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
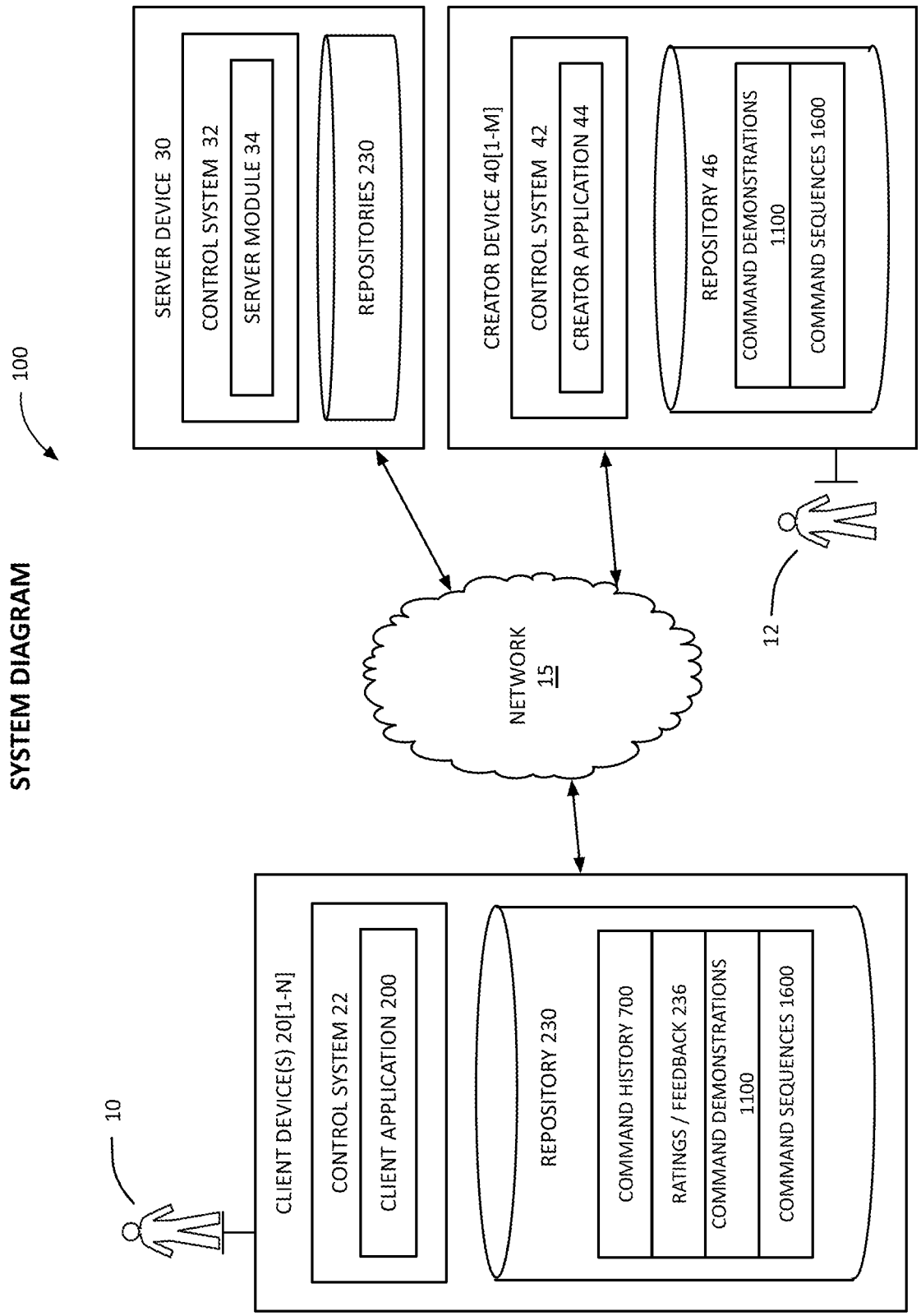
FIG. 1 is a conceptual illustration of a system that is configured to implement one or more aspects of the various embodiments.

Referring now to FIG. 1 a block diagram illustrates the elements of the system 100 that operate to enable the use of command usage tracking, command demonstrations, and command sequences. The system is comprised of a plurality of client devices 20 connected to a plurality of creator devices 40 through a server device using a network 15. Each client device 20 is associated with a client device user 10. Each client device 20 is comprised of a control system 22 and a repository 230. The client application 200 and repository 230 are described further in FIG. 2. Each creator device 40 is associated with a creator device user 12. Each creator device 40 is comprised of a control system 42 and a repository 46. The control system 42 is comprised of a creator application 44 used by the creator device user 12 to author command demonstrations 1100 and command sequences 1600. The server device 30 is comprised of a control system 32, server module 34, and repository 230. The server module 34 operates to provide the signaling between the client devices 20 and the creator devices 40. In some embodiments of the present disclosure, repository 230 is maintained solely on the client devices 20. In some embodiments, repository 230 is maintained on the server device 30 and accessed on an as-needed basis by the client device 20. In some embodiments, the repository 230 are maintained at both the server device 30 and client device 20 and synced based on network 15 availability.

Figure 2:
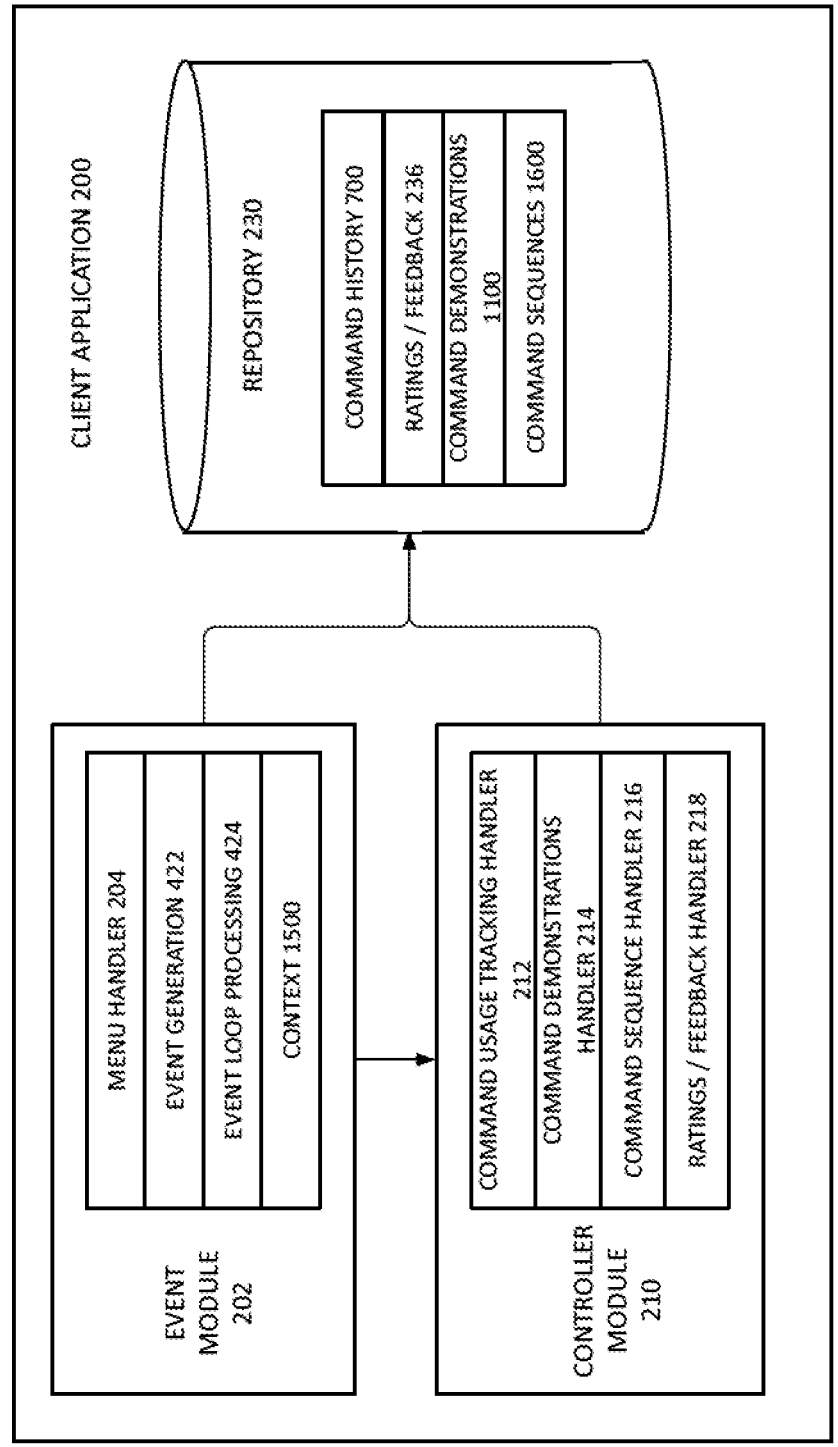
FIG. 2 is a more detailed illustration of the client application of FIG. 1, according to various embodiments.

Referring now to FIG. 2 a block diagram illustrates the elements of the client application 200. The client application is comprised of an event module 202, controller module 210, and repository 230. The event module 202 is comprised of a menu handler 204, event generation 422 element, event loop processing 424 element, and context 1500. The menu handler 204 operates to receive user interactions from the user and determine which commands should be enabled and which overlays and pop-up windows should be activated. Events are instantiated and sent to the event loop processing 424 element by the event generator 422 element in response to user inputs or other system-generated or detected inputs. The context 1500 structure holds information identifying the command currently being interacted with and the command history. The controller module 210 is comprised of a command usage tracking handler 212, a command demonstration handler 214, a command sequence handler 216, and a ratings/feedback handler 218. The command usage tracking handler 212 invokes the command usage tracking user interface 600, command usage tracking module 504, and command usage tracking rendering engine 506 of FIG. 5. The command demonstration handler 214 invokes the user interface 1000, command demonstration module 904, and command demonstration rendering engine 906 of FIG. 9. The command sequence handler 216 invokes the command sequence user interface 1400, command sequence module 1304, and command sequence rendering engine 1306 of FIG. 13. The ratings/feedback handler 218 operates to process feedback/ratings 236 received from the user 10 in relation to command demonstrations 1100 and command sequences 1600. Rating information is typically in a quantitative form and is used by the creator 12 to improve the performance of command demonstrations 1100 and command sequences 1600. Feedback information is typically in a qualitative form and is used by the creator 12 to improve the performance of command demonstrations 1100 and command sequences 1600. The repository 230 is comprised of a command history 700, ratings/feedback 236, command demonstrations 1100, and command sequences 1600. The command history 700 is described in FIG. 7.

Figure 3:
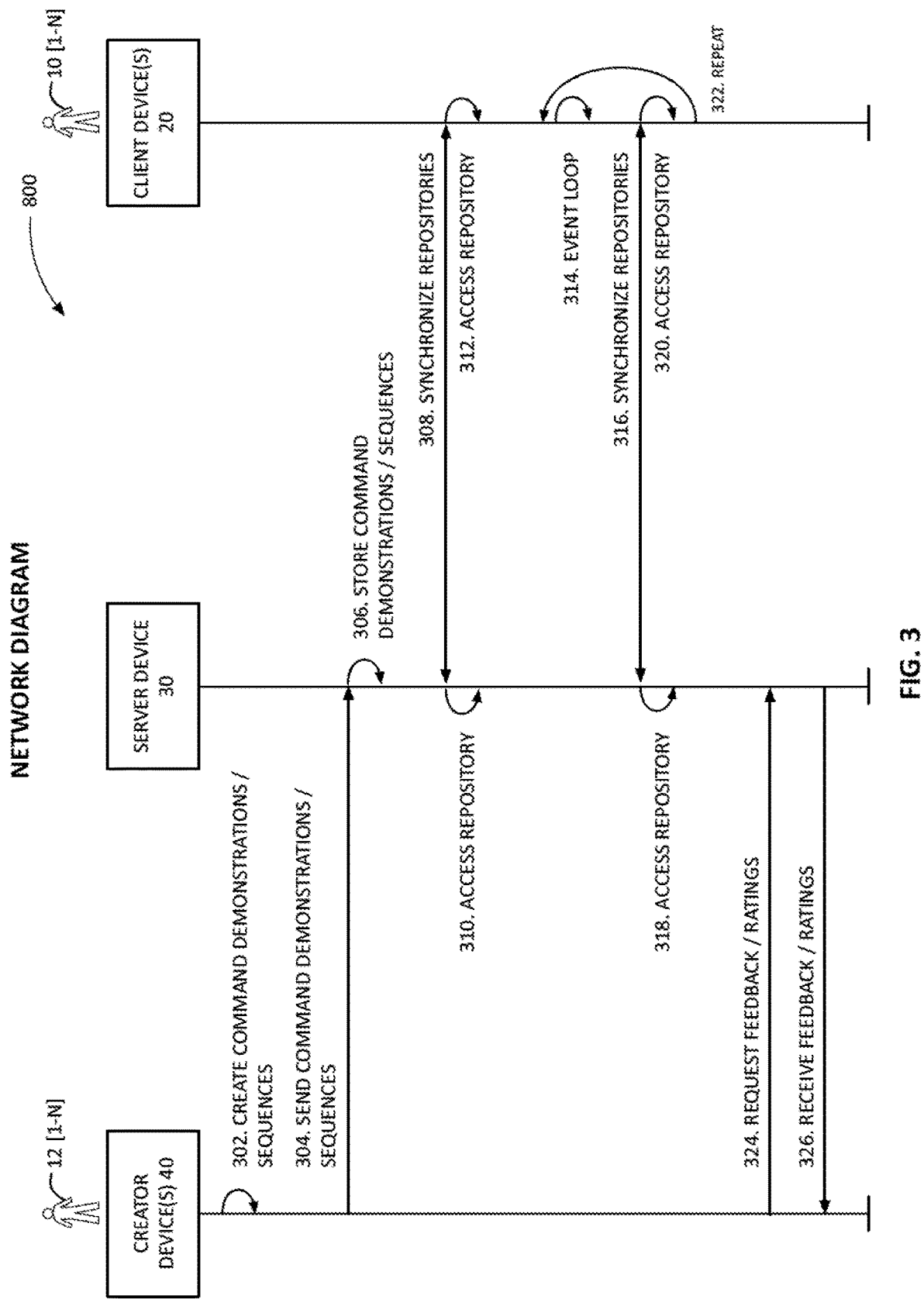
FIG. 3 is a more detailed illustration of the operations implemented by the system of FIG. 1, according to various embodiments.

Referring now to FIG. 3, a graphical illustration of a network diagram showing interactions between the creator device 40, server device 30, and client device 20 is presented. A creator 12 using a creator device 40 authors 302 command demonstrations 1100 and command sequences 1600 and sends 304 the command demonstrations 1100 and command sequences 1600 to the server device 30 for storage 306 and distribution via the repository 230. At the start of a session, synchronization 308 of the repository 230 on the client device 20 and the server device 30 occurs accessing 310 312 repositories 230 to ensure that the client device 20 has the latest command demonstrations 1100 and command sequences 1600. During an application client usage session 322, while running of the event loop 314, synchronization 316 repeatedly occurs accessing 318 320 repositories 230 and ensuring that the server device 30 has the latest feedback, ratings, and command history. The event loop 314 represents the client device 20 running the client application 200 comprising the event loop architecture 400. In some embodiments, a client-server model is employed with the client device making access to the server device. In some embodiments, the client device runs offline and only synchronizes when network 15 access is available. In some embodiments, the client application is provided as SAS (software-as-a-service). The creator device 40 requests 324 and receives 326 updated information on feedback and ratings from the server device 30 when available.

Figure 4:
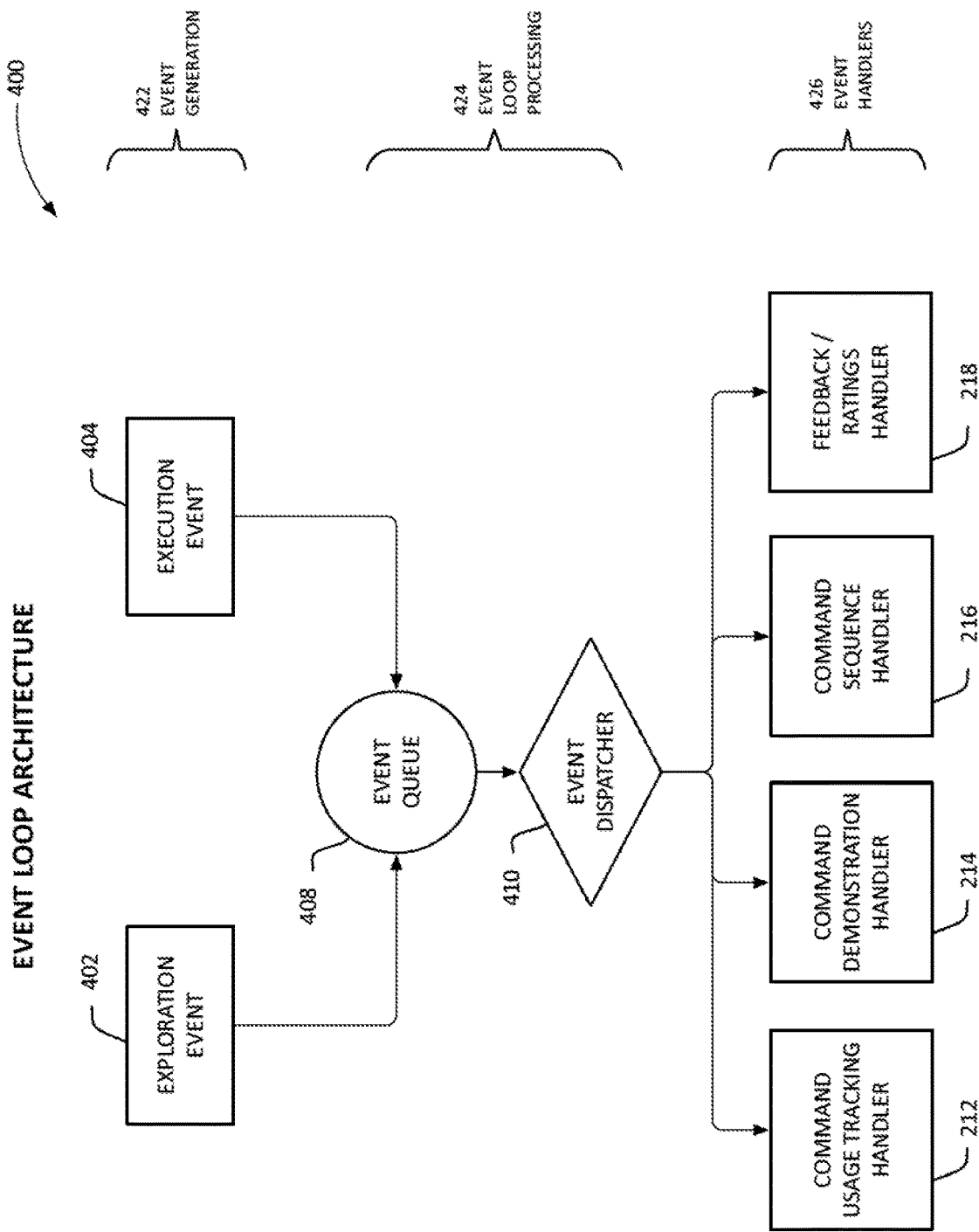
FIG. 4 is a conceptual illustration of an event architecture, according to various embodiments.

Referring now to FIG. 4, a graphical illustration of an event loop architecture 400 is presented. An event queue 408 operates to buffer events that occur in the system. The events are generated directly by the user through interaction with the client application 200 such as the exploration event 402 or the execution event 404. Upon completion of an event, the event dispatcher 410 requests the next event from the event queue 408 and directs the event to the appropriate event handler 426. Modules include the command usage tracking handler 212, command demonstration handler 214, command sequence handler 216, and feedback/ratings handler 218. The operation of the command usage tracking handler 212 is further described by the command usage tracking flowchart 800. The operation of the command demonstration handler 214 is further described by the command demonstration module flowchart 1200. The operation of the command sequence handler 216 is further described by the command sequence flowchart 1800. The feedback/ratings handler 218 operates to prompt the user for feedback/ratings and store the feedback/ratings in repository 230. The event loop architecture 400 presented herein is a simplified model and lacks many aspects present in a complete system.

Command Usage Tracking

Figure 5:
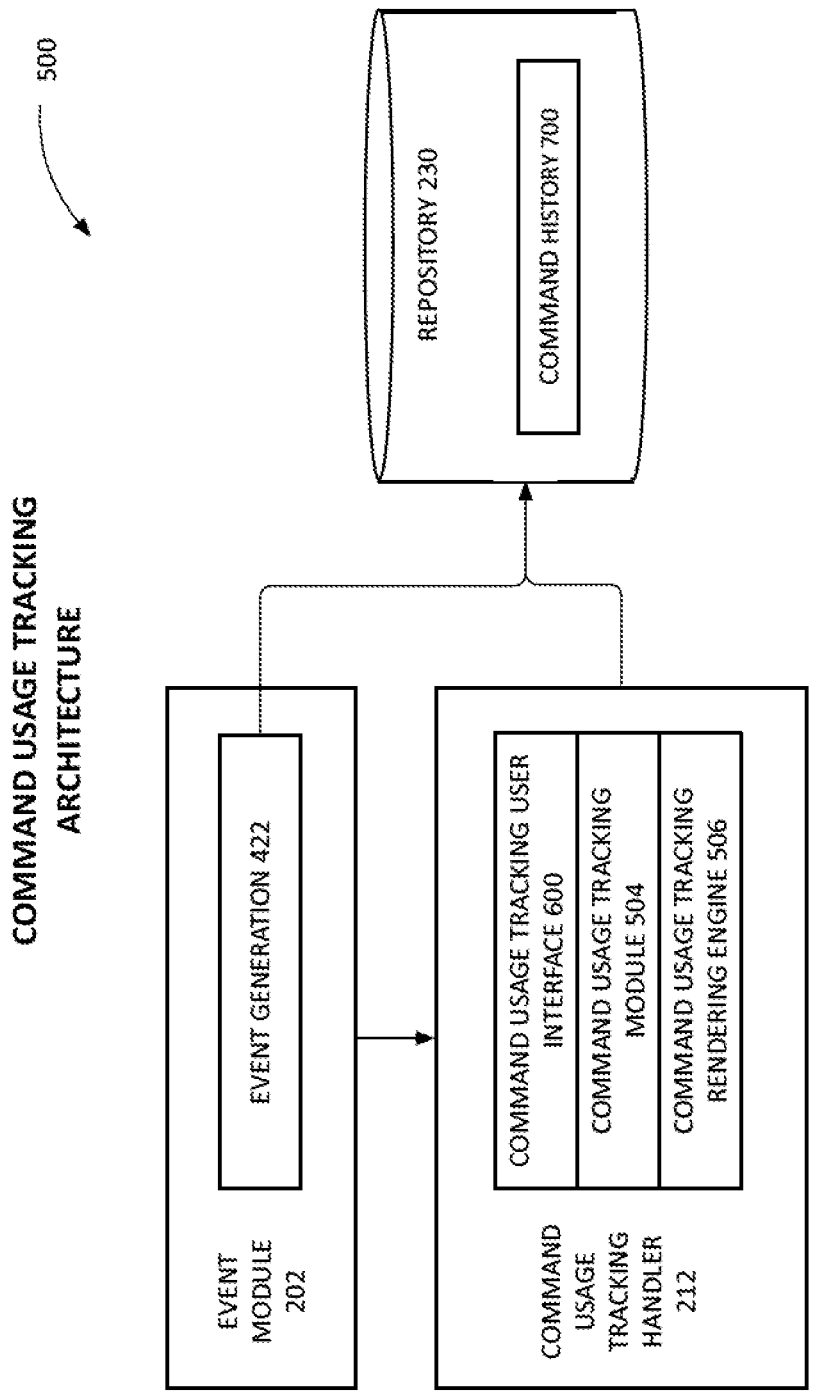
FIG. 5 is a conceptual illustration of a command usage tracking architecture, according to various embodiments.

Referring now to FIG. 5, a graphical illustration of an exemplary command usage tracking architecture 500 according is presented. The command usage tracking architecture 500 is derived from FIG. 1 and shows a simplified subset of elements that are used in command usage tracking. The event generation 422 element sends exploration events 402 and execution events 404 to the command usage tracking handler 212 via the event queue 408 and event dispatcher 410. Command usage tracking is accomplished through a command usage tracking user interface 600, command usage tracking module 504, and command usage tracking rendering engine 506. The command usage tracking user interface 600 presents the user interface elements for command usage tracking and is described further in FIG. 6. The command usage tracking module 504 operates on the command history 700 to track user exploration and execution of commands. The command usage tracking module 504 receives inputs from the command usage tracking user interface 600 and sends outputs to the command usage tracking rendering engine 506 for display. The command usage tracking rendering engine 506 operates to render visual elements of the command usage tracking user interface 600. Repository 230 includes the command history 700 structure described in FIG. 7.

Figure 6:
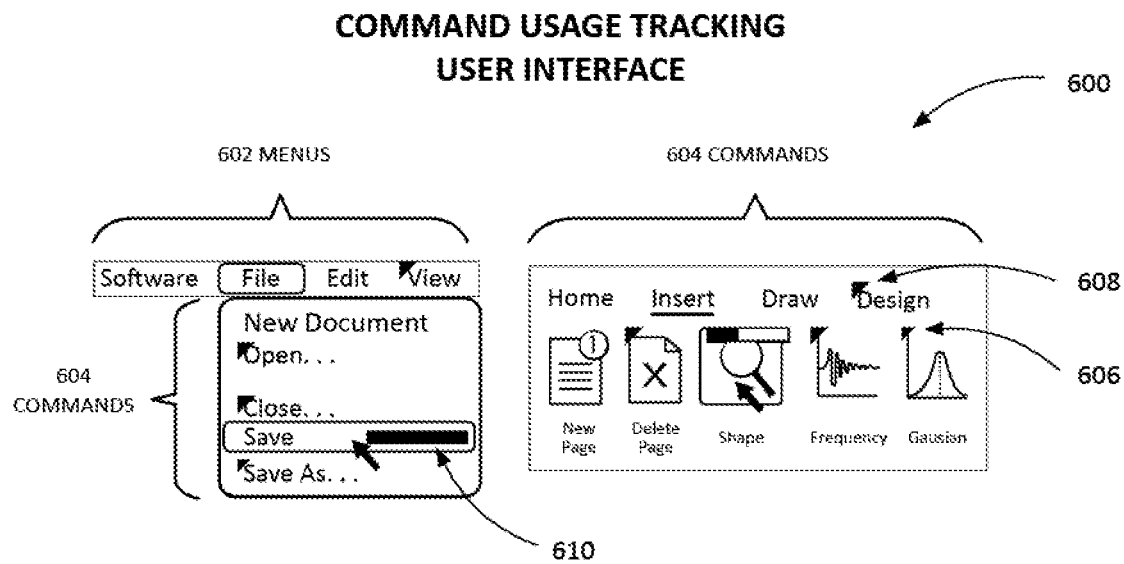
FIG. 6 is an illustration of an exemplary graphical user interface for command usage tracking, according to various embodiments.

Referring now to FIG. 6, a graphical illustration of an exemplary command usage tracking user interface 600 is presented. Command usage tracking describes a technique by which the system keeps track of which commands have been used and parameters modified within the client application 200 by the user 10. This allows the client application to present personalized information to the user identifying which commands have been used often enough to be familiar to the user and which commands have not been used enough, or never at all. This visual information will be readily available to the user in the interface as the user interacts with the program and will help guide the user through the learning process. The command usage tracking user interface 600 shows a number of menus 602 showing commands 604 available for selection by the user 10. Use of the commands 604 selected by the user 10 is tracked via the command history 700. The command history 700 is processed to determine coverage levels 714 and progress levels 712 which are in turn used to provide visual indicators 606 608 610 in the command usage tracking user interface 600. Commands 604 are presented with different visual indicators based on the level of user 10 interaction with each command 604.

In an exemplary embodiment of the following disclosure, user interaction is classified into three levels: level one indicates a command has never been executed or explored, level two indicates a command has been explored at least once, and level three indicates a command has been executed at least once. In some embodiments, a command is considered explored when the commands tooltip is opened at least once. In some embodiments, hovering over a command is accomplished by hovering over the command's tooltip. In this embodiment, commands at level one are presented with a first visual indicator 606, commands at level two are presented with a second visual indicator 608, and commands at level three are presented with a third indicator 610. In this embodiment, the first visual indicator 606 is a large triangle, the second visual indicator 608 is a small triangle, and the third visual indicator 610 is a progress bar. The progress bar indicates the number parameters associated with the command that have been explored. For example, a command with five available parameters where three have been modified will have a progress bar level of 60%.

Figure 7:
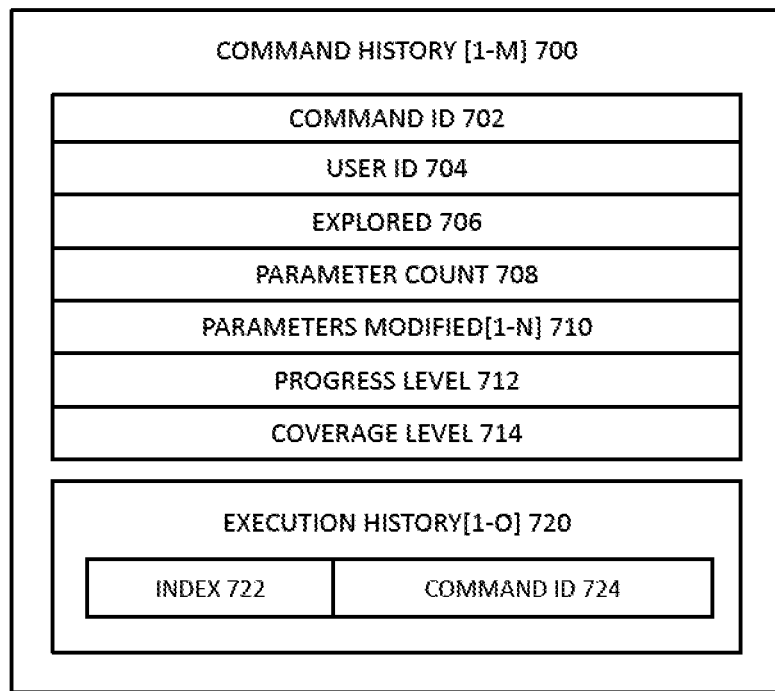
FIG. 7 is an illustration of an exemplary command history data structure, according to various embodiments.

Referring now to FIG. 7 a block diagram illustrates the elements of an exemplary command history 700 structure. The command history 700 is comprised of a command id 702, user id 704, explored 706 bit, parameter count 708, parameters modified 710 bit array, progress level 712, coverage level 714, and execution history 720. The command id 702 uniquely identifies the command from the plurality of other commands available in the software application. The user id 704 uniquely identifies the user from the plurality of other users using the software application in embodiments where the command history is stored at the server device 30. The explored 706 bit is initially unset and is set once the user explores a command. A command has been explored when the user hovers over the command with a pointing device (mouse for example). In some embodiments, selection occurs when a user right-clicks on a command. The parameter count 708 identifies the number of parameters available for a command. Parameters have a default setting. If a command parameter is modified in the user interface from its default state prior to command execution and executed using that modification, then that parameter is considered modified. The parameters modified 710 array holds parameter count 708 bits, each bit representing a different parameter. The bits in the parameters modified 710 array are set when the corresponding parameter has been modified. Progress level 712 identifies the percentage of parameters that have been modified. If there are five possible parameters and two have been modified, then the progress level is set to forty percent. Coverage level 714 identifies how well a command has been learned. The coverage levels 714 include: the command has never been explored or executed, the command has been explored at least once, and the command has been executed at least once. The execution history 720 includes a plurality of execution history elements, each execution history element having an index 722 and command id 724. The index 722 indicates the order in which the execution history 720 element is recorded in the execution history 720. The command id 724 identifies the command that was executed.

At the end of user interaction with a command, the command history is updated. In the case of exploration, the explored 706 bit is set. In the case of command execution, an entry is made in the execution history 720, the parameters modified 710 array is updated if additional parameters have been modified, and the progress level 712 is updated. In either case, coverage level 714 is updated.

Figure 8:
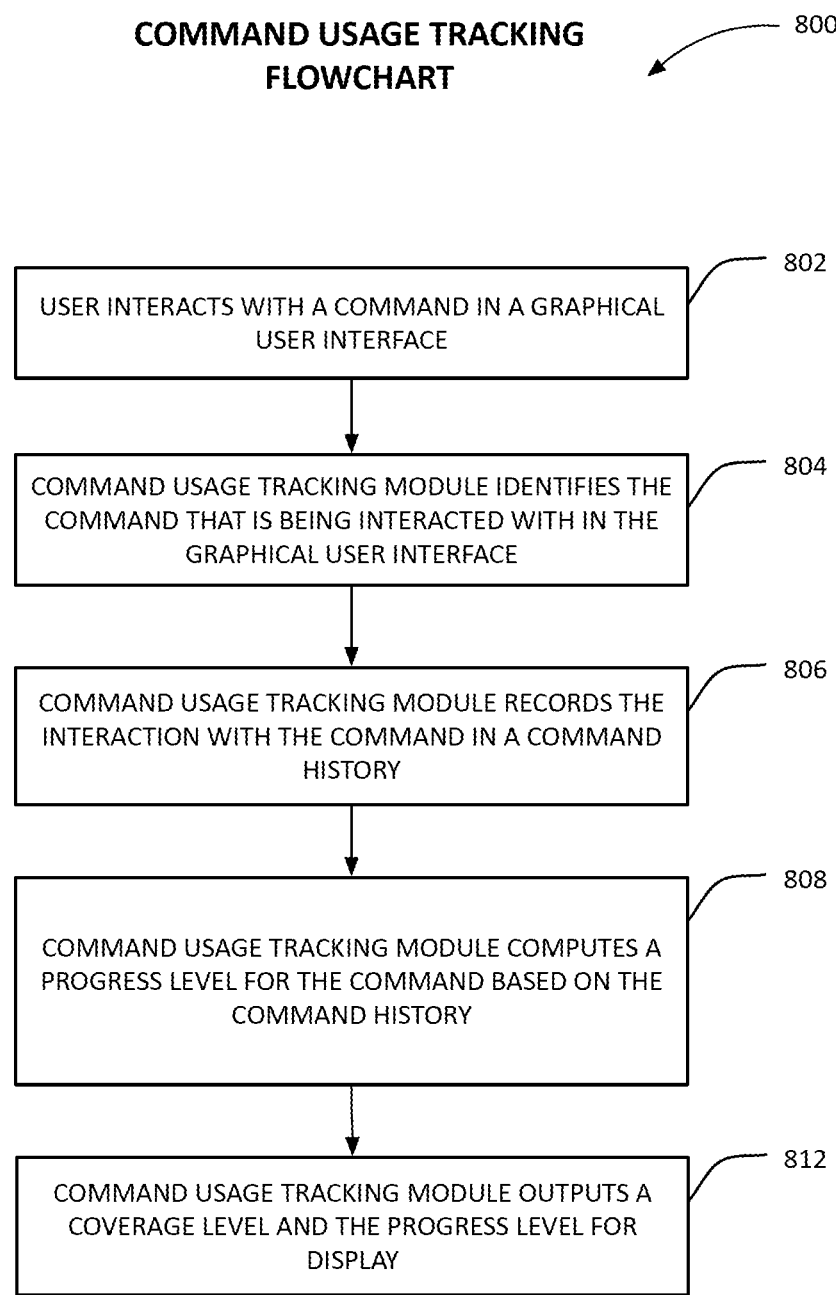
FIG. 8 is a flow diagram of method steps for tracking command usage, according to various embodiments.

Referring now to FIG. 8, a graphical illustration of an exemplary command usage tracking flowchart 800 is presented. The user interacts with a command in a graphical user interface of software application 802. The command usage tracking module identifies the command that is being interacted with in the graphical user interface, the interaction including either a command exploration or a command execution 804. The command usage tracking module records the interaction with the command in a command history 806. The command exploration is recorded by setting a parameter modified 710 bit. Command execution is tracked by recording each command executed in the execution history 720. The command usage tracking module computes a progress level for the command based on the command history, the progress level indicating a number of parameters modified out of the total number of possible parameters 808. The command usage tracking module determines the coverage level from the command history 810. The command usage tracking module outputs a coverage level and the progress level for display 812. The coverage level is one of: the command has never been explored or executed, the command has been explored at least once, and the command has been executed at least once.

Command Demonstration

Figure 9:
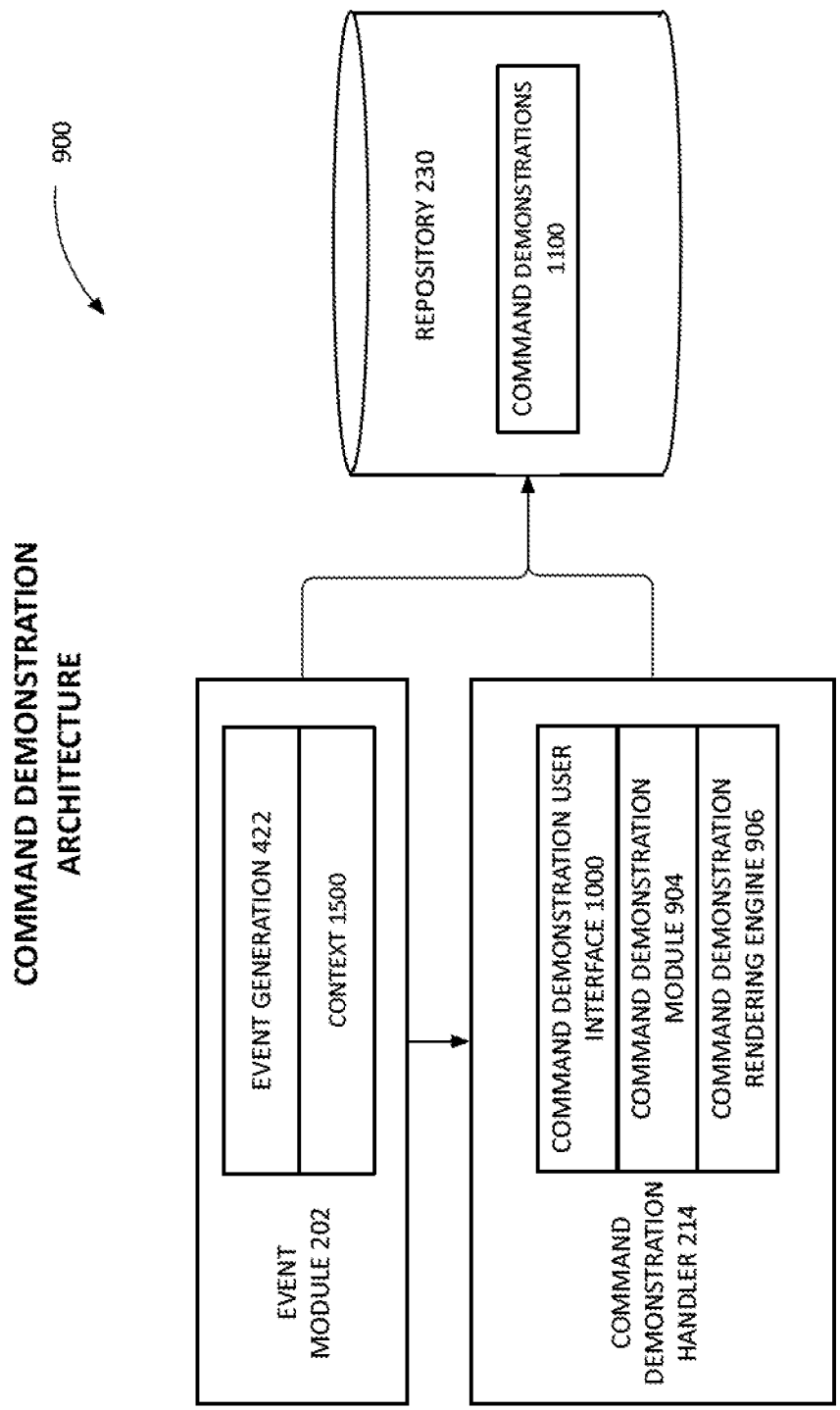
FIG. 9 is an illustration of an exemplary command demonstration architecture, according to various embodiments.

Referring now to FIG. 9, a graphical illustration of an exemplary command demonstration architecture 900 according is presented. The command demonstration architecture 900 is derived from FIG. 1 and shows a simplified subset of elements that are used in command demonstration. The event generation 422 element sends exploration events 402 and execution events 404 to the command demonstration handler 214 via the event queue 408 and event dispatcher 410. Command demonstration is accomplished through a command demonstration user interface 1000, command demonstration module 904, and command demonstration rendering engine 906. The command demonstration user interface 1000 presents the user interface elements for command demonstration and is described further in FIG. 10. The command demonstration user interface 1000 uses the context 1500 structure which includes zero or more restoration points 1504 set by the user to allow the user additional control over the recovery system. The command demonstration module 904 operates by causing the execution of command demonstrations 1100. The command demonstration module 904 receives input from the command demonstration user interface 1000 and sends outputs to the command demonstration rendering engine 906 for display. The command demonstration rendering engine 906 operates to render visual elements of the command demonstration user interface 1000. Repository 230 includes the command demonstrations 1100 structure described in FIG. 11.

Figure 10:
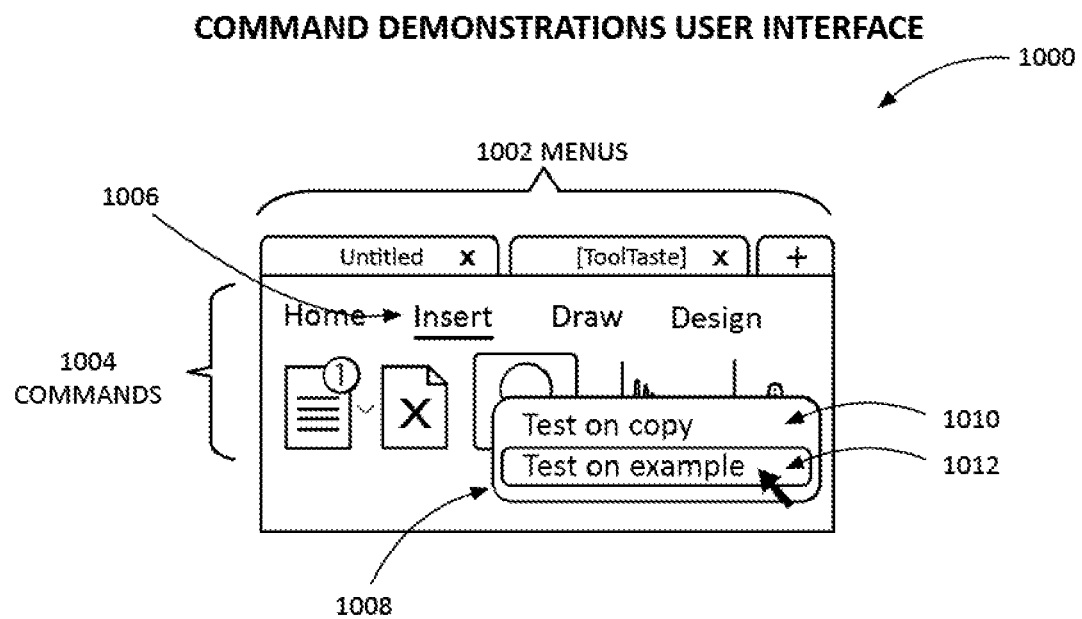
FIG. 10 is an illustration of an exemplary graphical user interface for executing command demonstrations, according to various embodiments.

Referring now to FIG. 10, a graphical illustration of an exemplary command demonstration user interface 1000 is presented. One problem with trial-and-error learning is that a user is hesitant to try new commands for fear of being unable to get back to a previous state, and perhaps lose data.

Additionally, some commands require that data be in a certain state before the command can be enabled and selected by the user. Command demonstrations solve this problem by providing a mechanism that enables the user to try the new command on either a sample data set if the current application data is not in the proper state for the new command to be enabled or a copy of their current data if the current application data is in the proper state for the new command to be enabled. This mechanism acts to mitigate user hesitancy in trying new commands, thus enabling the user to experience a larger set of available application commands. When sample data is used, the sample data is initialized from the sample data stored in the command demonstration. When current application data is used, an in-memory copy of the current application data is made. The exemplary command demonstration user interface 1000 is comprised of several menus 1002, each menu comprising of several commands 1004 whose availability changes based on the menu 1002 selected. Based on the command 1004 which is being explored, a user interface element 1008 is presented. In some embodiments, the user interface element 1008 is presented based on the user right clicking on a command 1006. The user interface element 1008 presents controls enabling a user to provide inputs used to select the execution of a command on sample data 1012 or on a copy of the current application data 1010. In some embodiments, the user interface element 1008 also includes menu items enabling the user to quickly reset the documents and rapidly run the command demonstration again with different parameters. The command demonstration is executed on a copy of application data to generate modified data. The command demonstration module causes a new window to be displayed in the graphical user interface. The command demonstration module causes the modified data to be displayed in the new window. The user updates the original window by executing the new command or modifies data from the new window by executing a new command.

Figure 11:
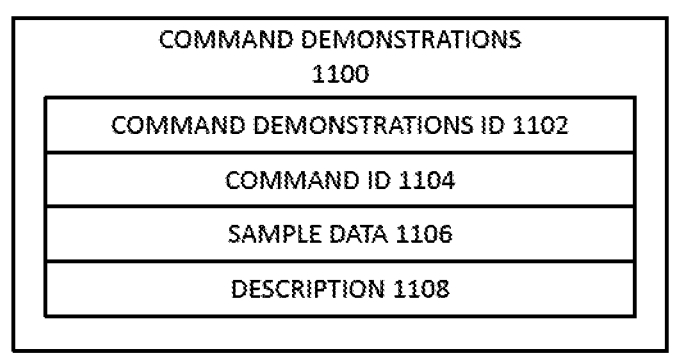
FIG. 11 is an illustration of an exemplary command demonstration data structure, according to various embodiments.

Referring now to FIG. 11 a block diagram illustrates the elements of the command demonstration 1100 structure. The command demonstration 1100 structure is comprised of a command demonstration id 1102, command id 1104, sample data 1106, and description 1108. The command demonstration id 1102 is a unique identifier among command demonstrations. The command id 1104 is the unique identifier among commands available in a software application. Command demonstrations are designed to operate on both curated sample data, referred to by sample data 1106, or a copy of the current application data. Description 1108 refers to a textual characterization of the command demonstration for use in the user interface.

Figure 12:
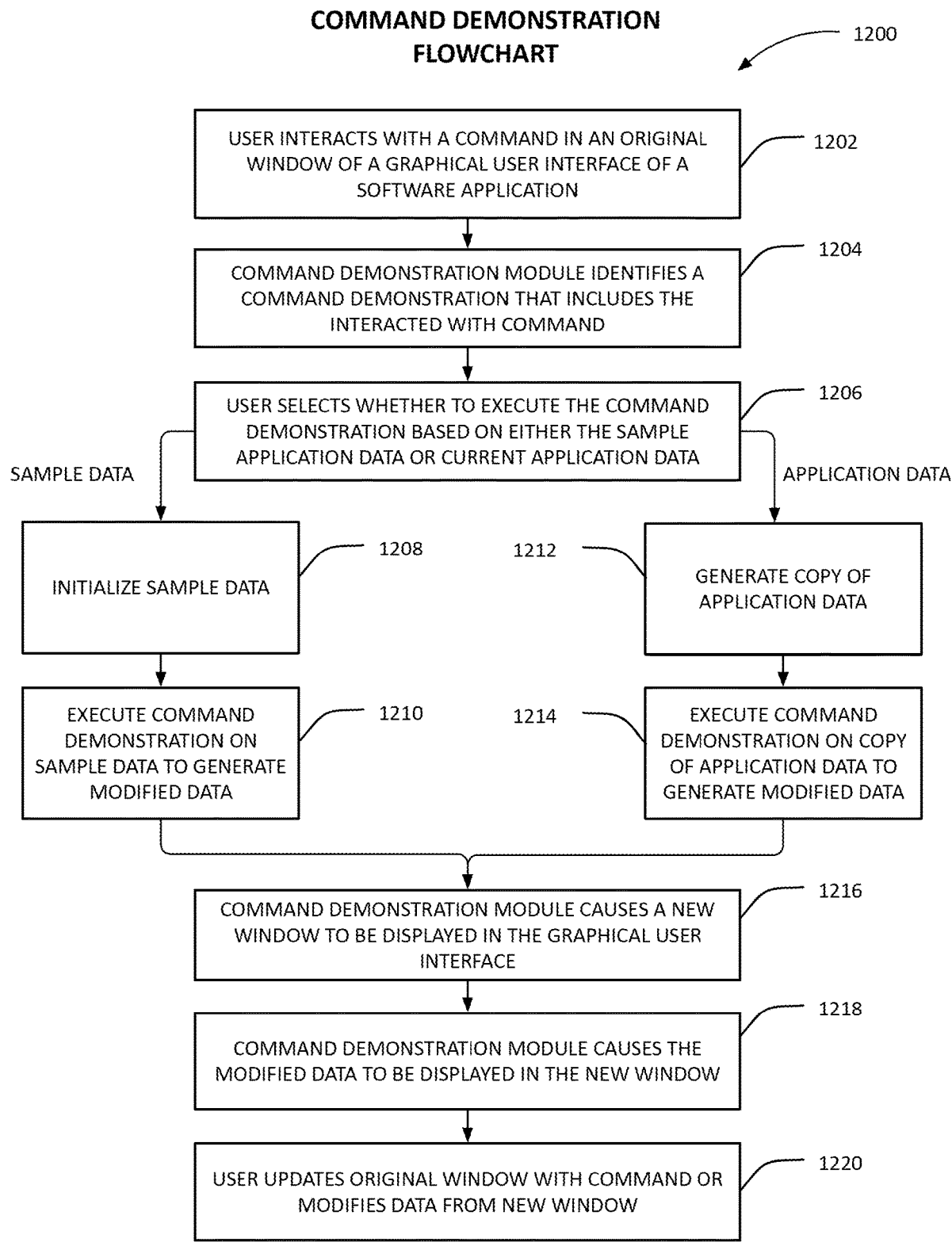
FIG. 12 is a flow diagram of method steps for executing a command demonstration, according to various embodiments.

Referring now to FIG. 12 a graphical illustration for an exemplary command demonstration handler flowchart 1200 is presented. The user interacts with a command in an original window of a graphical user interface of a software application 1202. The command demonstration module identifies a command demonstration that includes the interacted with command 1204. The user selects whether to execute the command demonstration based on either the sample application data or current application data 1206. In the case where sample application data is selected by the user, the sample data is initialized 1208. The command demonstration is then executed on sample data to generate modified data 1210. In the case where current application data is selected, a copy of the application data is generated 1212. The command demonstration is then executed on a copy of application data to generate modified data 1214. The command demonstration module causes a new window to be displayed in the graphical user interface 1216. The command demonstration module causes the modified data to be displayed in the new window 1218. The user updates the original window by executing the interacted with command or modifies data from the new window by executing a new command 1220.

Command Sequencing

Figure 13:
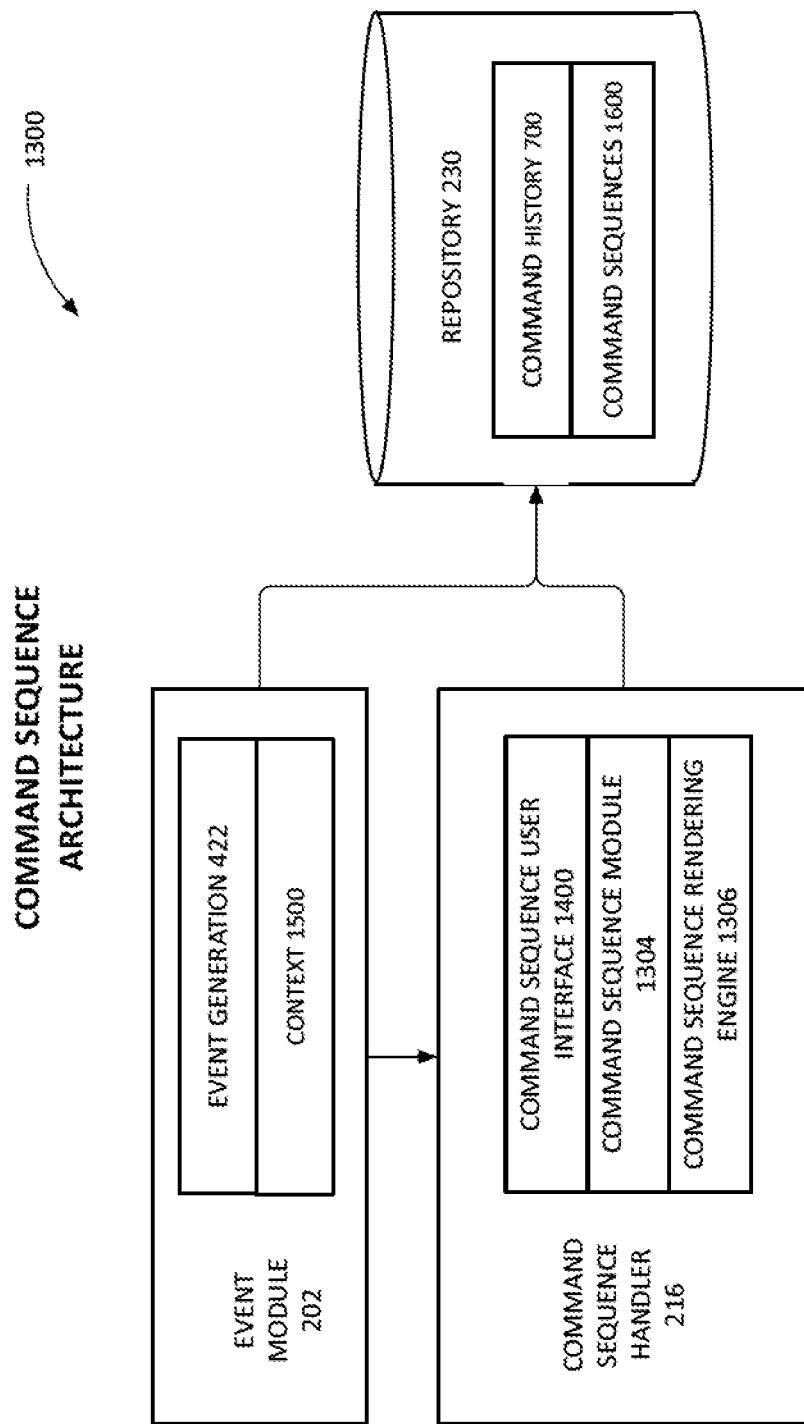
FIG. 13 is an illustration of an exemplary command sequence architecture, according to various embodiments.

Referring now to FIG. 13, a graphical illustration of an exemplary command sequence architecture 1300 according is presented. The command sequence architecture 1300 is derived from FIG. 1 and shows a simplified subset of elements that are used in command sequencing. The event generation 422 element sends exploration events 402 and execution events 404 to the command sequence handler 216 via the event queue 408 and event dispatcher 410. Command sequencing is accomplished through a command sequence user interface 1400, command sequence module 1304, and command sequence rendering engine 1306. The command sequence user interface 1400 presents the user interface elements for command sequencing and is described further FIG. 14. The command sequence user interface 1400 uses the context 1500 which includes the currently explored command 1502 to determine which command sequences to score according to the sample calculation shown in FIG. 17. The command sequence module 1304 receives inputs from the command sequence user interface 1400 and sends outputs to the command usage tracking rendering engine 1306 for display. The command sequence rendering engine 1306 operates to render visual elements of the command sequence user interface 1400. The repository 230 includes the command history 700 structure described in FIG. 7.

Figure 14:
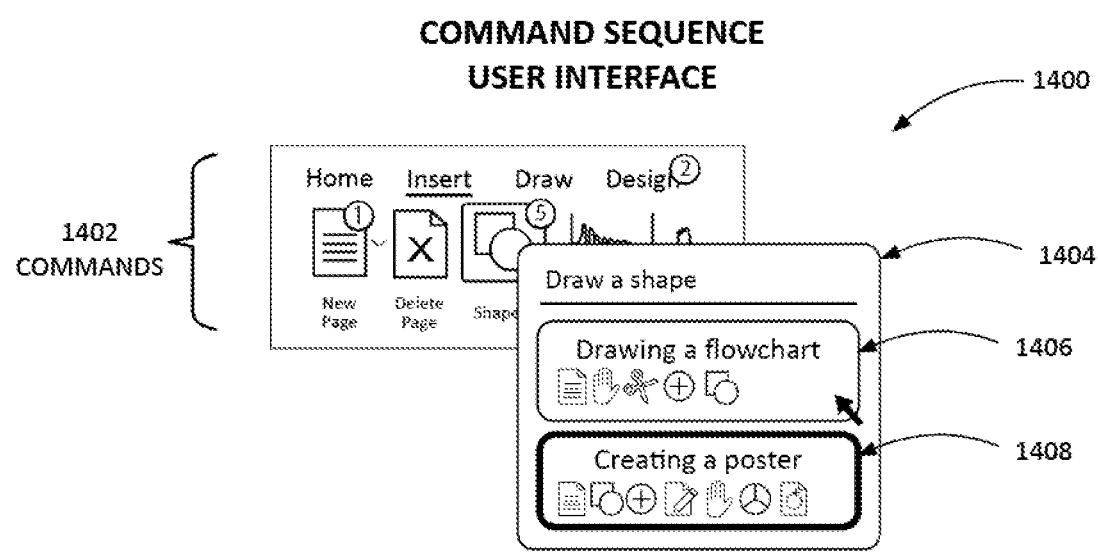
FIG. 14 is an illustration of an exemplary graphical user interface for selecting and executing a command sequence, according to various embodiments.

Referring now to FIG. 14, a graphical illustration of an exemplary command sequence user interface 1400 is presented. Command sequences are curated sequences of commands that are executed as a single entity upon selection by the user. Command sequences 1600 are presented to the user in the client application based on application context 1500 and the scoring techniques described in FIG. 17. In some embodiments, command sequences are presented in a command tooltip.

The exemplary command sequence user interface 1400 is comprised of several commands 1402. Based on the command 1402 which is being explored, a user interface element 1404 is presented. The user interface element 1404 presents controls enabling a user to provide inputs used to designate an execution of one or more command sequences. The command sequences which are presented in the user interface element 1404 are chosen based on one or more scoring techniques as described in the command sequence sample calculation 1700 of FIG. 17. In some embodiments, multiple scoring techniques are employed, and the presented command sequences are chosen from the combined outputs on those scoring techniques. Thus, the user is in fact encouraged to pursue trial-and-error learning and is productive without the need to leave the program in search of learning materials.

Figure 15:
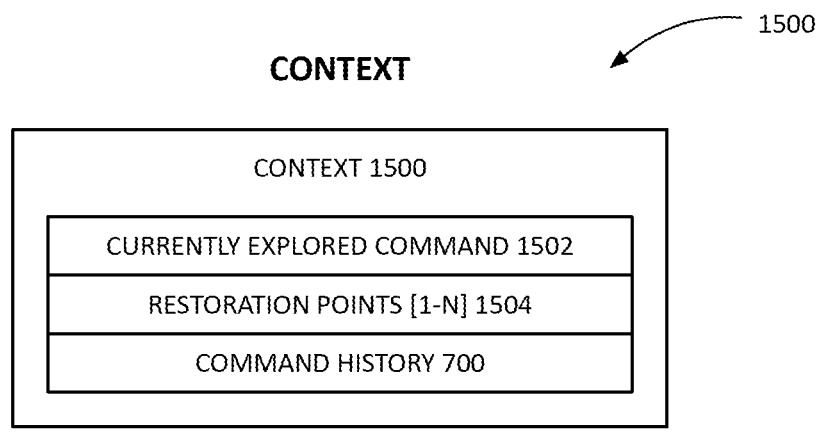
FIG. 15 is an illustration of an exemplary context data structure, according to various embodiments.

Referring now to FIG. 15 a block diagram illustrates the elements of the context 1500 structure. The context 1500 structure is comprised of a currently explored command 1502, zero or more restoration points 1504, and a command history 700. A currently explored command 1502 refers to a command that is represented by a user interface element that is being "hovered over". On a traditional desktop computer "hovering over" is accomplished by a mouse-controlled pointer being placed over the user interface element. Different platforms and architectures can have different mechanisms for pointing and hovering can be accomplished through differing mechanisms. Zero or more restoration points 1504 are used by the command demonstration module. Command demonstration uses a modified recovery system whereby restoration points 1504 are used to recover from a long chain of command executions. In some embodiments, the context includes geometry information reflecting the characteristics of the 2D/3D object currently being operated on in the user interface. Examples of information describing a 2D object include the object shape such as square, triangle, circle, rectangle, polyhedral, and the like. Examples of information describing a 3D object include the object's shape such as a cube, cuboid, cone, cylinder, sphere, polyhedron, and the like. Other important properties of 3D shapes include faces, edges, and vertices. In some embodiments, the context includes UI context information identifying commands currently available for use in the user interface through ribbons, tabs, or the like and that apply to the document that is currently in focus. Commands that are currently available for use are commands that are executable on the current object. The UI context also includes information identifying the high-level task being performed in the user interface. The command history 700 operates to store an execution history of commands that have been executed and is described further in FIG. 7. The context 1500 structure is maintained by the user interface and used by the command sequence module to determine command sequence scores.

Figure 16:
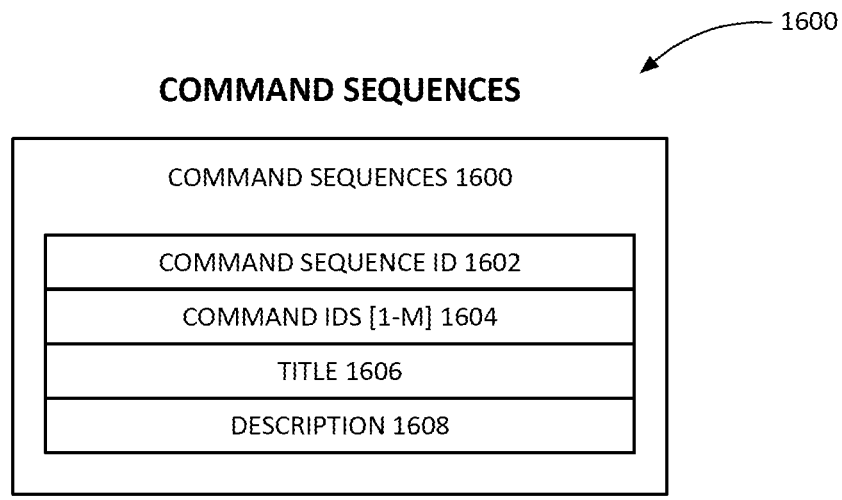
FIG. 16 is an illustration of an exemplary command sequence data structure, according to various embodiments.

Referring now to FIG. 16 a block diagram illustrates the elements of the command sequence 1600 structure. The command sequence 1600 structure is comprised of a command sequence id 1602, sequence of command ids 1604, title 1606, and description 1608. The command sequence id 1602 is a unique identifier among command sequences. The sequence of command ids 1604 identifies the ordered sequence of command identifiers comprising the command sequence 1600. The title 1606 is a textual name of the command sequence assigned by the creator of the command sequence. The description 1608 is a textual characterization of the command sequence assigned by the creator of the command sequence.

In some embodiments, a scoring calculation as further described in FIG. 17 is employed. The database of command sequences is filtered to produce a subset of command sequences that include the currently explored command. A score is then computed based on the number of commands in the command sequence that also appear in the user's recent command history. Whenever a command in the command sequence also appears in the last N commands in the command history, the inverse frequency of the command is added to the command sequences score. The inverse frequency of a command is computed as the percentage of the number of times the command occurs throughout the database of command sequences. One or more highest scoring command sequences are chosen from this scoring technique.

A variation of the above scoring technique identifies commands that are used infrequently. In this variation, the inverse frequency of commands that appear in the command sequence but have not been explored is summed. In some embodiments, the inverse frequency of commands that appear in the command sequence but have not been executed is summed. In either instance, one or more highest scoring command sequences are chosen. In some embodiments, one or more highest scoring command sequences are chosen from both techniques.

In some embodiments, the geometry of the shape being manipulated is also used in computing command sequence scores. The command sequence scores are adjusted to favor command sequences that include commands executable on the geometry currently being manipulated in the user interface. For example, command sequences that do not include commands executable on the geometry currently being manipulated in the user interface could be given no weight or excluded from consideration in scoring. In some embodiments, the command sequence scores are adjusted to favor command sequences that operate on the geometry currently being manipulated in the user interface. For example, command sequences that do not operate on the geometry currently being manipulated in the user interface could be given no weight or excluded from consideration in scoring.

In some embodiments, the UI context is also used in computing command sequence scores. The command sequence scores are adjusted to favor commands included in the UI context. In this embodiment, the UI context includes commands that are displayed and active in the user interface. The command sequence scores are adjusted based on the number of commands that occur in common between the UI context and the commands included in the command sequences. For example, command sequences that do not include at least one command from the UI context could be given no weight or excluded from consideration in scoring. In some embodiments, the command sequence scores are adjusted to favor command sequences that match the task being performed in the user interface. For example, command sequences that do not match the task being performed in the user interface could be given zero weight or excluded from consideration in scoring.

Referring now to FIG. 17, a graphical illustration of an exemplary scoring calculation used in designating a command sequence for contextual presentation is presented 1700. The calculation starts by determining a subset of command sequences to score. The subset of command sequences is determined by searching for those command sequences that include the currently explored command 1502. In the example of FIG. 17 the currently explored command 1502 is "2" and all four available sequences include a "2". Therefore, the subset will include all four command sequences. The four identified command sequences 1600 are shown 1706. The first two command sequences 1600 include six commands, the second includes three, and the last includes four. The exemplary calculation uses the execution history 720 which is displayed with the most recently executed command 1704 at the top. The intermediate steps required to perform the calculation are shown in the intermediate computations table 1708. The exemplary scoring calculation counts the occurrences 1710 of each command in the command sequences table 1706. Command id "1" occurs two times, command id "2" occurs four times, etc. The total number of commands in the sequences is nineteen 1714. The inverse frequency 1712 is computed as the number of occurrences for a particular command 1710 over the number of commands in all sequences (nineteen) 1714.

Two scoring techniques 1716 are shown for computing command sequence scores 1718. According to a first scoring technique 1720, a score is determined by computing the sum of the inverse frequencies for each unique command occurring in a command sequence and the execution history 720. For command sequence 1, commands "1", "2", "3", and "4" meet that criterion. Command "8" appears in command sequence 1 but not in the execution history 720. The inverse frequencies 1712 for commands "1", "2", "3", and "4" are 0.11, 0.21, 0.11, and 0.26 respectively. The sum of those four numbers is 0.68. According to technique one 1720, one or more highest scoring sequences based on sequence scores 1718 are selected. According to a second scoring technique 1722, a score is determined by computing the sum of the inverse frequencies 1712 for each unique command occurring in a command sequence and not occurring in the command history. Command "8" appears in command sequence 1 but not in the execution history 720. The inverse frequency of command "8" is 0.05. According to technique two 1722, one or more highest scoring sequences based on sequence scores 1718 are selected. In some embodiments, a mixture of sequences from technique one 1720 and technique two 1722 is selected. In some embodiments, only the last N most recently occurring commands in the execution history is considered in the computation.

Figure 18:
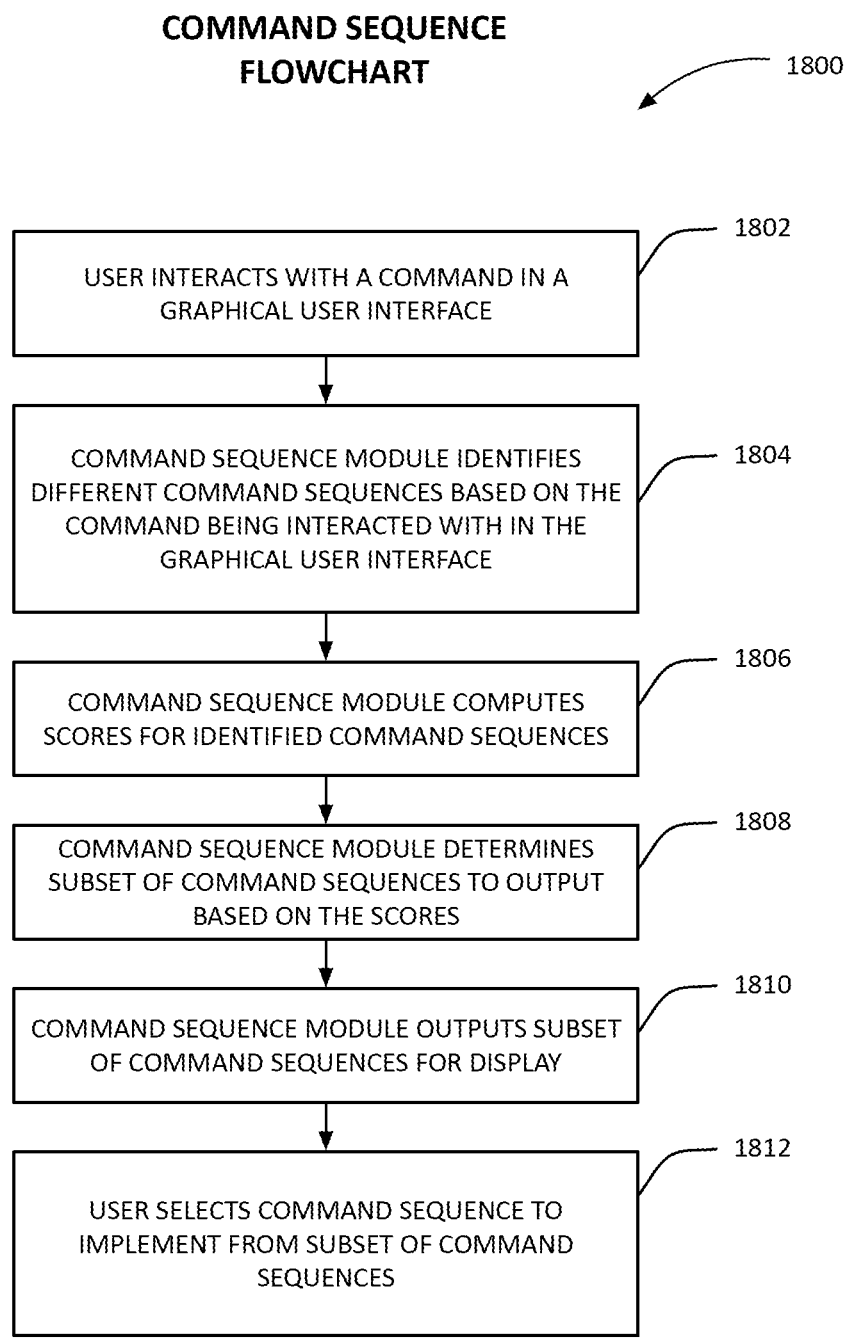
FIG. 18 is flow diagram of method steps for outputting command sequences to a user, according to various embodiments.

Referring now to FIG. 18, a graphical illustration for an exemplary command sequence flowchart 1800 is presented. The user interacts with a command in a graphical user interface of a software application 1802. The command sequence module identifies different command sequences based on the command being interacted with in the graphical user interface 1804. The command sequence module computes scores for the identified command sequences 1806. The command sequence module determines a subset of command sequences to output based on the scores 1808. The command sequence module outputs the subset of command sequences for display 1810. The user selects a command sequence to implement from different command sequences included in the subset of command sequences 1812.

Combining Command Usage Tracking, Command Demonstrations, and Command Sequencing While command usage tracking, command demonstration, and command sequencing are described above as being used individually, the techniques are also used in combination in some embodiments. In some embodiments, command usage tracking and command demonstration are used together by updating the command history based on the command used in an execution of a command demonstration. In some embodiments, command usage tracking and command sequencing are used together by updating the command history based on the commands used in the execution of a command sequence. In some embodiments, command demonstration and command sequencing are used together by providing the curated sample data introduced with command demonstration for use with command sequencing. In some embodiments, command demonstration and command sequencing are used together by using the restoration points of command demonstration together with command sequencing.

Figure 19:
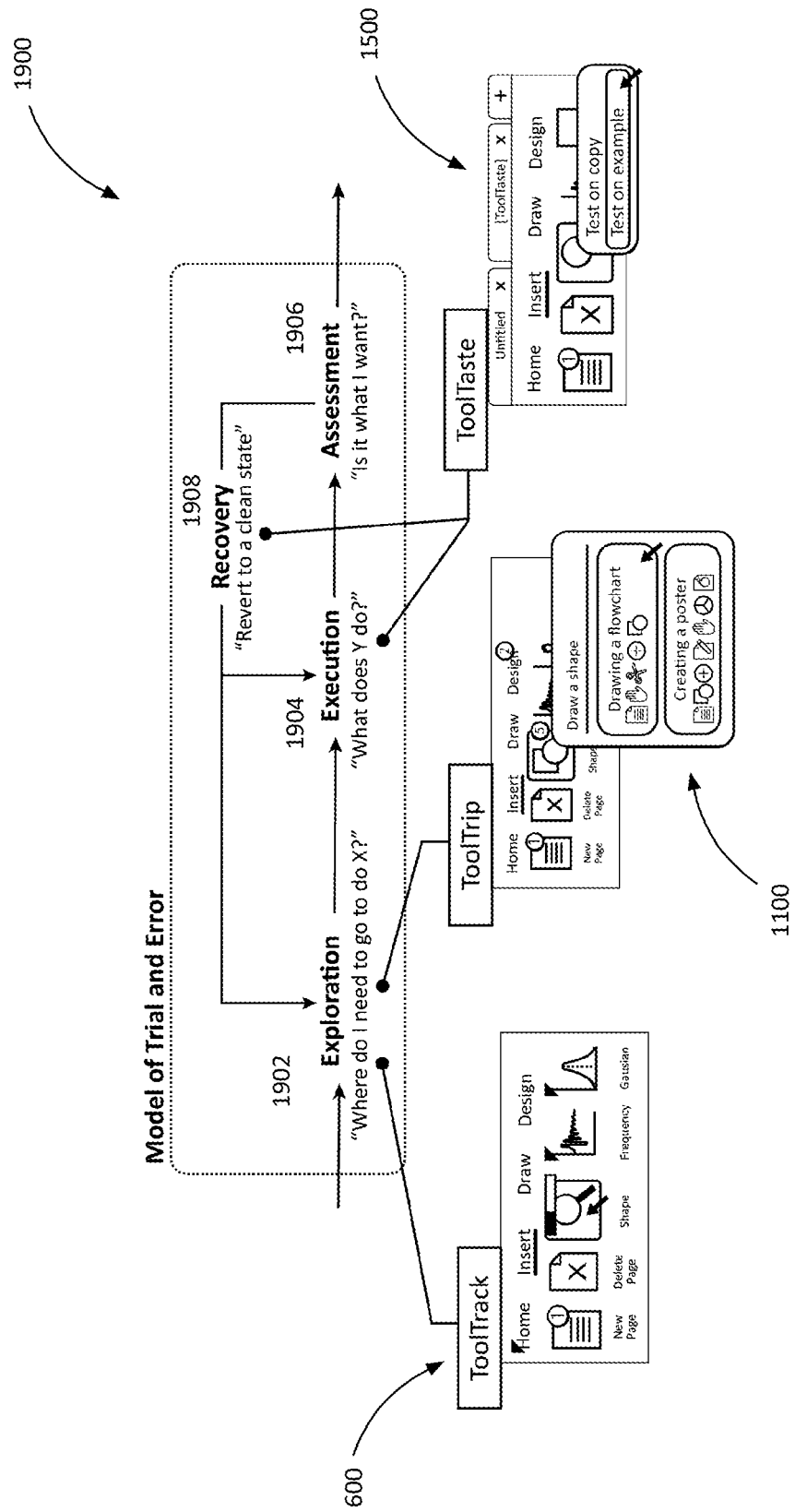
FIG. 19 is an illustration of an exemplary graphical user interface for trial-and-error learning of application commands, according to various embodiments.

Referring now to FIG. 19, a graphical illustration of an exemplary model for trial-and-error learning is presented 1900. Command usage tracking 600, command demonstration 1000, and command sequencing 1400 have been presented and described separately above. However, command usage tracking 600, command demonstration 1000, and command sequencing 1400 are parts of a larger framework and are used together to form a virtuous circle promoting trial-and-error learning. The flowchart 1900 shows a model for trial-and-error learning that includes exploration 1902, execution 1904, assessment 1906, and recovery 1908. In the exploration phase 1902, given a set of commands, users attempt to find commands that are likely to achieve a desired result. The exact exploration strategy differs among users and the users experience with a current client application as well as previous client applications. The search can appear random or can be more targeted if the user has partial knowledge of the application. In this phase, command usage tracking is important to guide the user through which commands have been explored and which have not. Command sequences 1600 are also important because command sequences help both identify areas to explore and also provide trial executions. In the execution phase 1904, the user executes commands to learn what the commands do. In the execution phase, a user can try a command just to see what the command does, or the user can try the command because the user us looking to solve a specific problem. Regardless of the reason, trying a command without fear of losing data and regardless of the state of that data is important. Thus, command demonstrations 1100 are important in this phase. In the assessment phase 1906, occurring after executing the command, users decide if the result is satisfactory. In practice, the assessment phase often boils down to checking if the result appears correct. Consequently, even if this result is a workaround and differs from what an expert would have done, the result might satisfy the user and can prove acceptable. If users are satisfied, then the trial-and-error episode is complete and successful. Otherwise, users will have to go to the last phase, the recovery phase 1908. In the recovery phase, the state is in preparation for a new trial-and-error attempt. This can be done by manually reverting the changes, or by using the built-in undo mechanism. In both cases, this recovery can be tedious and error-prone. Once the prior state has been re-covered, users can switch to a different help strategy, go back to the execution phase 1904 to further experiment with the command, or return to the exploration phase 1902 to look for a different command.

Figure 20:
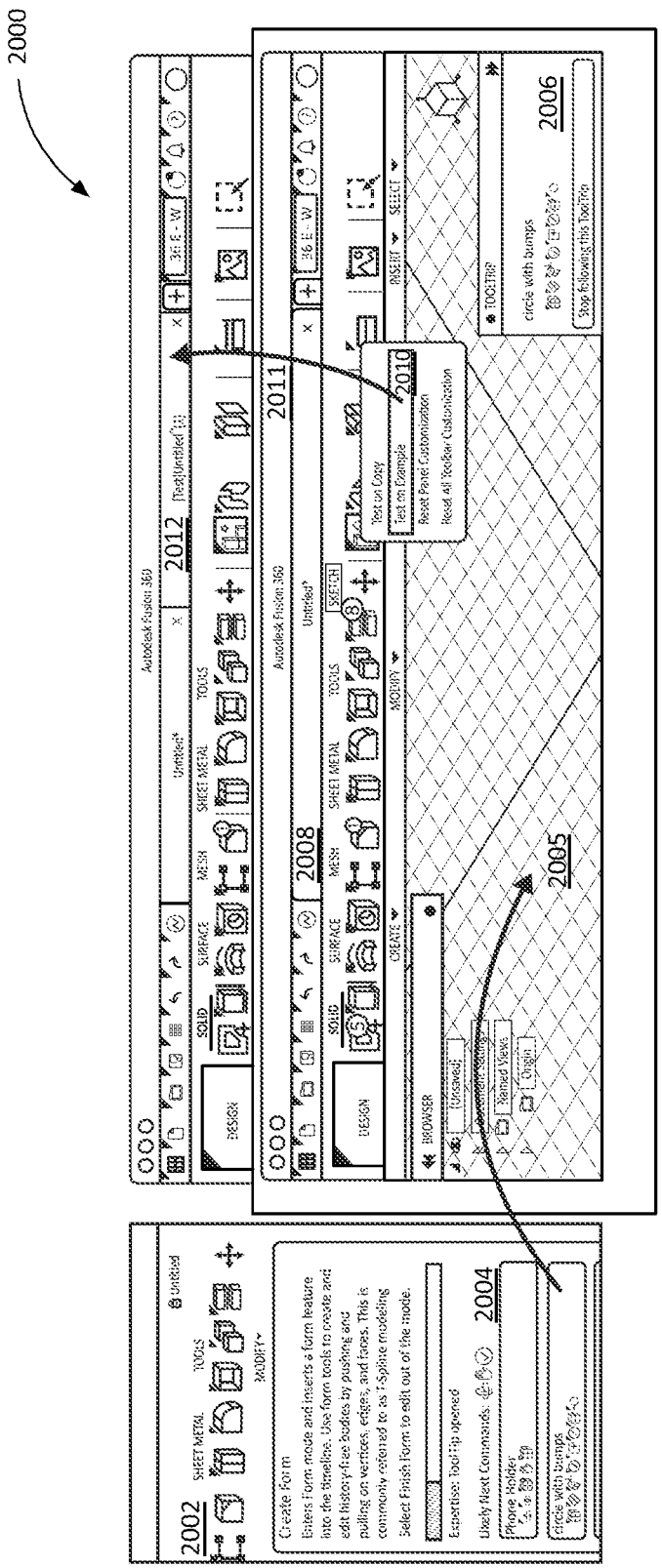
FIG. 20 is an illustration of an exemplary graphical user interface for implementing command usage tracking, command demonstrations, and command sequences simultaneously, according to various embodiments.

Referring now to FIG. 20, a graphical illustration of an exemplary user interface using command usage tracking, command demonstrations, and command sequencing together is presented 2000. Previously, the user interfaces for command usage tracking 600, command demonstration 1000, and command sequencing 1400 have been shown separately. In FIG. 20, command usage tracking 600, command demonstration 1000, and command sequencing 1400 are shown together, with slight modifications, in a single application. This exemplary client application 200 represents a Computer Aided Drawing (CAD) application used to create sketches of 3D models and to turn the models into printable models.

Command usage tracking 2002 is used to show how extensively a command has been investigated. In this example, a command that has never been explored will have a large corner triangle, this corner decreases in size if the command's tooltip has been looked at and will completely disappear once the command has been executed once. Hovering over the button or menu will show a progress bar indicating how many parameters associated with this command have been explored. ToolTips include a progress bar showing command usage tracking information, frequent next commands as extracted from command sequences, and three popular command sequences that involve the command being hovered.

Each command sequence is shown with a title, and an ordered sequence of unique icons for each command composing the command sequence (limited to 10), with commands that have never been used displaying a large corner triangle. Hovering over a command sequence will result in the commands that are part of the command sequence to self-identify by displaying a badge of the color of the trip 2008. Additionally, users can hover over individual command icons in the tooltip 2004 which will then highlight only that specific command in the interface.

Clicking on a command sequence 2005 in the tooltip will result in pinning that particular command sequence. A new view is opened at the right of the application showing the title of the command sequence and the list of icons for commands in the command sequence 2006. Users hover over each icon in the command sequence to locate the corresponding command in the interface. While this view is pinned, commands in the interface that are part of the command sequence display a badge with a number indicating their position in the sequence. Users can stop following the command sequence by clicking the "Stop" button 2006.

Command demonstration displays two options for specifying the source of data on which to apply a command being explored: "Test on copy" and "Test on example" 2010. Clicking these menu options 2011 will open a new tab with either an example-model that we created for that purpose before-hand, or a copy of the current model. Copies are made in-memory to ensure a smooth experience. This new tab is displayed in a different color than the original window and titled "[TEST]" for emphasis 2012. Users can then manipulate the test model as the users would manipulate the original model. Alternatively, users can close the tab to discard the changes, or save the model if satisfied with the result.

Figure 21:
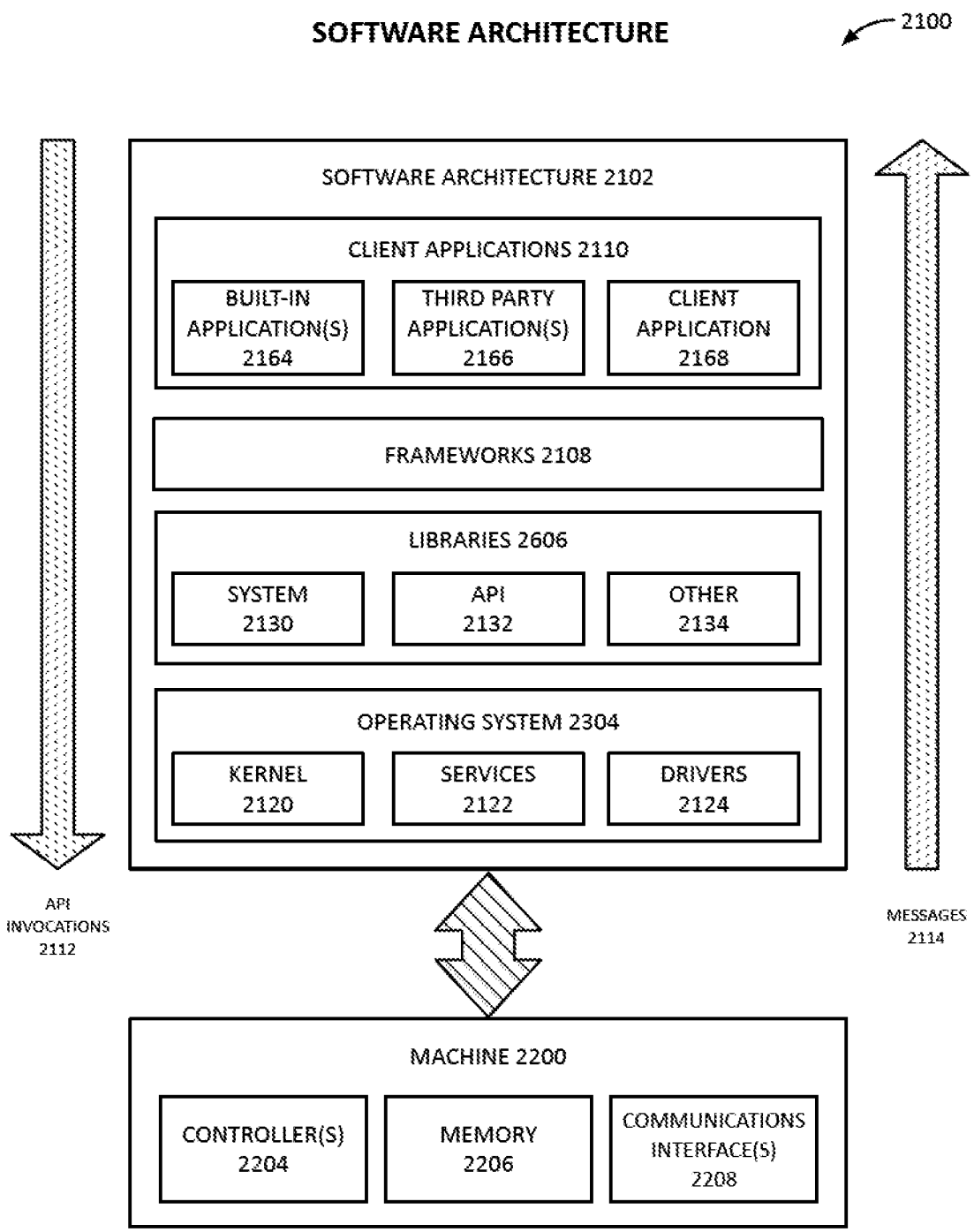
FIG. 21 is a conceptual illustration of an exemplary software architecture configured to implement one or more aspects of the various embodiments.

FIG. 21 is a block diagram 2100 illustrating an exemplary software architecture 2102, which can be employed on machine 2130. The client device server device 30, and creator device 40 are all examples of machines 2200. FIG. 21 is merely a non-limiting example of a software architecture, and it will be appreciated that many other architectures can be implemented to facilitate the functionality described herein. Other embodiments include additional elements not shown in FIG. 21 and not all embodiments will include all of the elements of FIG. 21. In various embodiments, the software architecture 2102 is implemented by hardware such as machine 2230 of FIG. 15 that includes processors 2232, memory 2234, and I/O components 22360. In this example architecture, the software architecture 2102 can be conceptualized as a stack of layers where each layer provides a particular functionality. For example, the software architecture 2102 includes layers such as an operating system 2104, libraries 2106, frameworks 2108, and applications 2110. Operationally, the applications 2110 invoke application programming interface (API) calls 2112 through the software stack and receive messages 2114 in response to the API calls 2112, consistent with some embodiments.

In various implementations, the operating system 2104 manages hardware resources and provides common services. The operating system 2104 includes, for example, a kernel 2120, services 2122, and drivers 2124. The kernel 2120 acts as an abstraction layer between the hardware and the other software layers, consistent with some embodiments. For example, the kernel 2120 provides memory management, processor management (e.g., scheduling), component management, networking, and security settings, among other functionality. The services 2122 can provide other common services for the other software layers. The drivers 2124 are responsible for controlling or interfacing with the underlying hardware, according to some embodiments. For instance, the drivers 2124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In some embodiments, the libraries 2106 provide a low-level common infrastructure utilized by the applications 2110. The libraries 2106 can include system libraries 2130 (e.g., C standard library) that can provide functions such as memory allocation functions, string manipulation functions, mathematic functions, and the like. In addition, the libraries 2106 can include API libraries 2132 such as media libraries, graphics libraries, database libraries, web libraries, and the like. The libraries 2106 can also include a wide variety of other libraries 2134 to provide many other APIs to the applications 2110.

The frameworks 2108 provide a high-level common infrastructure that can be utilized by the applications 2110, according to some embodiments. For example, the frameworks 2108 provide various graphic user interface (GUI) functions, high-level resource management, high-level location services, and so forth. The frameworks 2108 can provide a broad spectrum of other APIs that can be utilized by the applications 2110, some of which are specific to a particular operating system 2104 or platform.

According to some embodiments, the applications 2110 are programs that execute functions defined in the programs. Various programming languages can be employed to create one or more of the applications 2110, structured in a variety of manners, such as object-oriented programming languages (e.g., Objective-C, Java, or C++) or procedural programming languages (e.g., C or assembly language). In a specific example, the third-party application 2166 (e.g., an application 2110 developed using the WINDOWS® or MACOS™ software development kit (SDK) by an entity other than the vendor of the particular platform) is desktop software running on a desktop operating system such as WINDOWS® or MACOS™, or another desktop operating system. In this example, the third-party application 2166 can invoke the API calls 2112 provided by the operating system 2104 to facilitate functionality described herein. While exemplary embodiments are described in the context of a desktop application, the techniques described herein are not limited thereto. The techniques described herein are applicable to desktop applications, mobile applications, software as a service (SAS) systems, web applications, and the like. Likewise, the techniques described herein are not limited to desktop computers, The techniques described herein apply to mobile devices and any device with the hardware and software resources required to implement the techniques.

Figure 22:
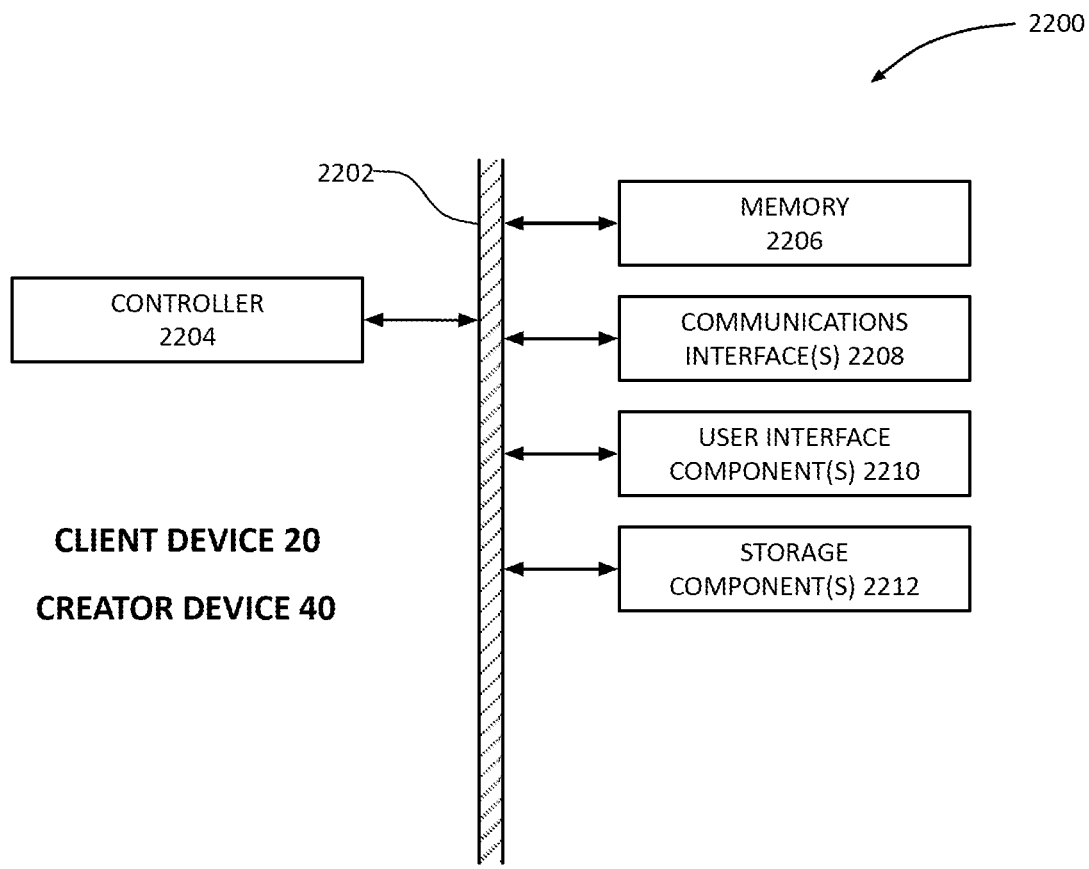
FIG. 22 is a conceptual illustration an exemplary client device hardware architecture configured to implement one or more aspects of the various embodiments.

FIG. 22 is a graphical illustration 2200 of the client device 20 and creator device 40. The client device 20 and creator device 40 are examples embodiments of the software architecture of FIG. 21. The client device 20 and creator device 40 include a controller 2204 communicatively connected to memory 2206, one or more communications interfaces 2208, one or more user interface components 2310, and one or more storage devices 2212 by a bus 2202 or similar mechanism. The controller 2204 is, for example a microprocessor, digital ASIC, FPGA, or the like. In the present disclosure, the controller 2204 is a microprocessor, and the client application 200 is implemented in software and stored in the memory 2206 for execution by the controller 2204. However, the present disclosure is not limited thereto. The aforementioned functions and module is implemented in software, hardware, or a combination thereof. Further, the repository 230 is stored in the one or more secondary storage components 2212. The client device 20 and creator device 40 also include a communication interface 2208 enabling the client device 20 to connect to the network 15. For example, the communications interface 2208 is a local wireless interface such as a wireless interface operating according to one of the suite of IEEE 802.11 standards, BLUETOOTH®, or the like. However, the present disclosure is not limited thereto. The one or more user interface components 2210 include, for example, a touchscreen, a display, one or more user input components (e.g., a keypad), a speaker, or the like, or any combination thereof. The storage component(s) 2212 is a non-volatile memory.

Figure 23:
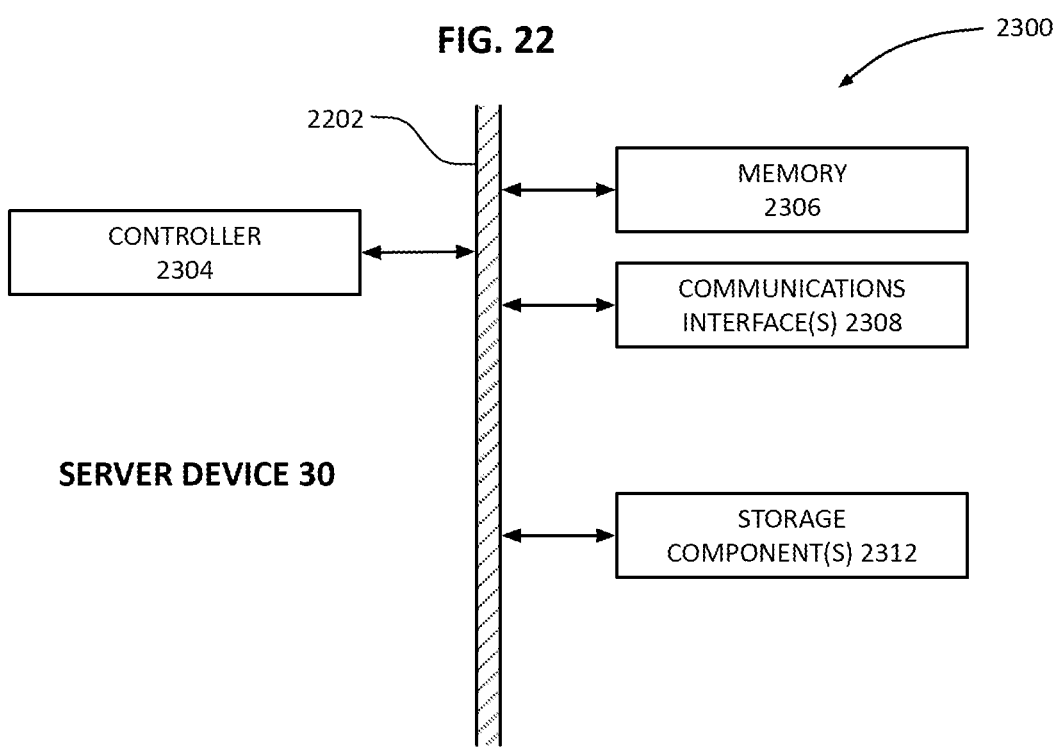
FIG. 23 is a conceptual illustration an exemplary server device hardware architecture configured to implement one or more aspects of the various embodiments.

Referring to FIG. 23, the server device 30 includes a controller 2304 communicatively connected to memory 2306, one or more communications interfaces 2308, and one or more storage devices 2312 by a bus 2302 or similar mechanism. The controller 2304 is, for example a microprocessor, digital ASIC, FPGA, or the like. In this embodiment, the controller 2304 is a microprocessor, and the software application is implemented in software and stored in the memory 2306 for execution by the controller 2304. However, the present disclosure is not limited thereto. The aforementioned module is implemented in software, hardware, or a combination thereof. The server device 30 also includes a communication interface 2308 enabling the server device 30 to connect to the network 15. For example, the communications interface 2308 is a wired interface such as an Ethernet interface. However, the present disclosure is not limited thereto. The repository 230 is stored in the one or more secondary storage components 2312. The secondary storage components 2312 is digital data storage components such as, for example, one or more hard disk drives. However, the present invention is not limited thereto. The server device 30 is also an instance of the software architecture of FIG. 21. In some embodiments the server device 30 is a rack mount server and/or a blade server. Server devices 30 are often optimized for speed, throughput, power consumption, and reliability.

In sum, techniques are disclosed that enable command usage tracking in a software application. The techniques track command exploration and command execution to produce command usage information. Command exploration occurs when a user hovers over a command with a pointing device or right clicks on the command. Command execution occurs when a user selects a command for execution. The command parameters modified when a command is executed are recorded in the command history. A progress level is computed based on how many of the available command parameters are modified during the command execution. A coverage level is determined based on the command history. The coverage level indicates if the command has never been explored or executed, the command has been explored at least once, or the command has been executed at least once. The command coverage level and the progress level are translated into visual elements and presented in the graphical user interface.

The disclosed techniques also enable a user of a software application to select and use command demonstrations. The command demonstrations are identified from a database based a command currently being explored by the user. Again, command exploration occurs when a user hovers over a command with a pointing device or right clicks on the command. The command demonstrations are stored with sample data, which allows commands to be executed on data other than current application data. Accordingly, the user can choose whether to execute the commands associated with a given command demonstration on either the related sample data or current application data. When the user chooses to execute the commands on the related sample data, the sample data is initialized, and then the relevant commands are executed on the initialized sample data to generate modified data. When the user chooses to executed the commands on current application data, a copy of the current application is generated, and then the relevant commands are executed on the copy of the current application data to generate modified data. In either case, the modified data is output to a new window in the graphical user interface and made accessible to the user.

The disclosed techniques also enable a user of a software application to select and use previously implemented sequences of commands on a current workflow. Command recommendations are automatically generated by identifying command sequences stored in a database based on a current application context that includes information identifying a command that is currently being explored by a user and a command history. Again, command exploration occurs when a user hovers over a command with a pointing device or right clicks on the command, and the command history sets forth the different commands executed by the user in the past. The command sequences identified from the database are then scored based on the commands included in the command history and the commands included in the command sequences. One or more of the identified command sequences are presented in the user interface of the software application based on the scores. The user then selects a given command sequence to execute from the command sequences presented in the user interface.

At least one technical advantage of the disclosed techniques relative to the prior art is that the disclosed techniques provide a user of a software application with several ways to interact with the software application on a "trial-and-error" basis when learning how to use the different features and functions of the software application. In this regard, the disclosed techniques enable command usage tracking, which allows a user of a software application to keep track of the commands that he/she has already used and explored as well as overall learning progress. The disclosed techniques also enable a user of a software application to select and use previously-implemented sequences of commands on a current workflow, which helps the user better understand which commands should be used in combination within one another and the order in which those commands should be executed. Another technical advantage of the disclosed techniques is that the disclosed techniques provide a user of a software application with a way to execute commands on a copy of the data associated with his/her current workflow or on sample data. Thus, the user can practice using the features and functions of the software application on a "trial-and-error" basis and on contextually-relevant data, which provides the user with a richer and enhanced learning experience relative to what can be achieved with conventional help features. The technical advantages provide one or more technological advancements over prior art approaches.

1. In some embodiments, a computer-implemented method for automatically generating command recommendations for a software workflow comprises: identifying a plurality of command sequences stored in a database based on a current command being interacted with in a graphical user interface; computing a score for each command sequence included in the plurality of command sequences based on one or more commands included in the command sequence and one or more commands included in a command history; determining at least one command sequence included in the plurality of command sequences to output based on the scores; and outputting the at least one command sequence for display.

2. The computer-implemented method of clause 1, wherein the current command being interacted with in the graphical user interface comprises a command that is being explored by a user or a command that has been clicked on by a user.

3. The computer-implemented method of clauses 1 or 2, wherein computing the score for each command sequence included in the plurality of command sequences comprises determining a number of commands that occur in both the one or more commands included in the command sequence and the one or more commands included in the command history.

4. The computer-implemented method of clauses 1-3, wherein computing the score for each command sequence included in the plurality of command sequences comprises determining that no commands occur in both the one or more commands included in the command sequence and the one or more commands included in the command history.

5. The computer-implemented method of clauses 1-4, wherein computing the score for each command sequence included in the plurality of command sequences comprises determining a number of times a given command occurs in all command sequences stored in the database, and determining a total number of commands in all the command sequences stored in the database.

6. The computer-implemented method of clauses 1-5, wherein the one or more commands included in the command history comprise commands that have been most recently added to the command history.

7. The computer-implemented method of claim 1-6, wherein two or more scoring techniques are implemented in determining that at least one command sequence included in the plurality of command sequences is to be output.

8. The computer-implemented method of clauses 1-7, further comprising receiving a selection within the graphical user interface to execute the at least one command sequence.

9. The computer-implemented method of clauses 1-8, further comprising updating the command history to indicate that the one or more commands included in the command sequence have been executed.

10. The computer-implemented method of clauses 1-9, further comprising receiving a selection to set a restoration point prior to receiving the selection to execute the at least one command sequence.

11. In some embodiments, one or more non-transitory computer-readable media storing instructions that, when executed by one or more processors, cause the one or more processors to perform the steps of: identifying a plurality of command sequences stored in a database based on a current command being interacted with in a graphical user interface; computing a score for each command sequence included in the plurality of command sequences based on one or more commands included in the command sequence and one or more commands included in a command history; 11. determining at least one command sequence included in the plurality of command sequences to output based on the scores; and outputting the at least one command sequence for display.

12. The one or more non-transitory computer-readable media of clause 11, wherein the score for each command sequence is further based on a geometry being interacted with the graphical user interface.

13. The one or more non-transitory computer-readable media of clauses 11 or 12, wherein the score for each command sequence is further based on matching one or more commands related to a task being performed in the graphical user interface.

14. The one or more non-transitory computer-readable media of clauses 11-13, further comprising receiving a selection within the graphical user interface to execute the at least one command sequence.

15. The one or more non-transitory computer-readable media of clauses 11-14, further comprising updating the command history to indicate that the one or more commands included in the command sequence have been executed.

16. The one or more non-transitory computer-readable media of clauses 11-15, further comprising receiving a selection to set a restoration point prior to receiving the selection to execute the at least one command sequence.

17. The one or more non-transitory computer-readable media of clauses 11-16, further comprising receiving a selection to restore the restoration point after receiving the selection to execute the at least one command sequence.

18. The one or more non-transitory computer-readable media of clauses 11-17, further comprising: receiving a selection of whether to execute the command sequence on sample application data or current application; and causing the command sequence to be executed on either the sample application data or a copy of the current application data to generate modified data.

19. The one or more non-transitory computer-readable media of clauses 11-18, further comprising: receiving rating and feedback information associated with the at least one command sequence; and transmitting the rating and feedback information to a server device for storage or further processing.

20. In some embodiments, a system comprises: one or more memories storing instructions; and one or more processors that are coupled to the one or more memories and, when executing the instructions, are configured to perform the steps of: identifying a plurality of command sequences stored in a database based on a current command being interacted with in a graphical user interface; computing a score for each command sequence included in the plurality of command sequences based on one or more commands included in the command sequence and one or more commands included in a command history; determining at least one command sequence included in the plurality of command sequences to output based on the scores; and outputting the at least one command sequence for display.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically generating command recommendations for a software workflow, the method comprising:
    identifying a plurality of command sequences stored in a database based on a current command being interacted with in a graphical user interface;
    computing a score for each command sequence included in the plurality of command sequences based on one or more commands included in the command sequence and one or more commands included in a command history;
    determining at least one command sequence included in the plurality of command sequences to output based on the scores; and
    outputting the at least one command sequence for display.

2. The computer-implemented method of claim 1, wherein the current command being interacted with in the graphical user interface comprises a command that is being explored by a user or a command that has been clicked on by a user.

3. The computer-implemented method of claim 1, wherein computing the score for each command sequence included in the plurality of command sequences comprises determining a number of commands that occur in both the one or more commands included in the command sequence and the one or more commands included in the command history.

4. The computer-implemented method of claim 1, wherein computing the score for each command sequence included in the plurality of command sequences comprises determining that no commands occur in both the one or more commands included in the command sequence and the one or more commands included in the command history.

5. The computer-implemented method of claim 1, wherein computing the score for each command sequence included in the plurality of command sequences comprises determining a number of times a given command occurs in all command sequences stored in the database, and determining a total number of commands in all the command sequences stored in the database.

6. The computer-implemented method of claim 1, wherein the one or more commands included in the command history comprise commands that have been most recently added to the command history.

7. The computer-implemented method of claim 1, wherein two or more scoring techniques are implemented in determining that at least one command sequence included in the plurality of command sequences is to be output.

8. The computer-implemented method of claim 1, further comprising receiving a selection within the graphical user interface to execute the at least one command sequence.

9. The computer-implemented method of claim 8, further comprising updating the command history to indicate that the one or more commands included in the command sequence have been executed.

10. The computer-implemented method of claim 8, further comprising receiving a selection to set a restoration point prior to receiving the selection to execute the at least one command sequence.

11. One or more non-transitory computer-readable media storing instructions that, when executed by one or more processors, cause the one or more processors to perform the steps of:
   identifying a plurality of command sequences stored in a database based on a current command being interacted with in a graphical user interface;
   computing a score for each command sequence included in the plurality of command sequences based on one or more commands included in the command sequence and one or more commands included in a command history;
   determining at least one command sequence included in the plurality of command sequences to output based on the scores; and
   outputting the at least one command sequence for display.

12. The one or more non-transitory computer-readable media of claim 11, wherein the score for each command sequence is further based on a geometry being interacted with the graphical user interface.

13. The one or more non-transitory computer-readable media of claim 11, wherein the score for each command sequence is further based on matching one or more commands related to a task being performed in the graphical user interface.

14. The one or more non-transitory computer-readable media of claim 11, further comprising receiving a selection within the graphical user interface to execute the at least one command sequence.

15. The one or more non-transitory computer-readable media of claim 14, further comprising updating the command history to indicate that the one or more commands included in the command sequence have been executed.

16. The one or more non-transitory computer-readable media of claim 14, further comprising receiving a selection to set a restoration point prior to receiving the selection to execute the at least one command sequence.

17. The one or more non-transitory computer-readable media of claim 16, further comprising receiving a selection to restore the restoration point after receiving the selection to execute the at least one command sequence.

18. The one or more non-transitory computer-readable media of claim 11, further comprising:
   receiving a selection of whether to execute the command sequence on sample application data or current application; and
   causing the command sequence to be executed on either the sample application data or a copy of the current application data to generate modified data.

19. The one or more non-transitory computer-readable media of claim 11, further comprising:
   receiving rating and feedback information associated with the at least one command sequence; and
   transmitting the rating and feedback information to a server device for storage or further processing.

20. A system comprising:
   one or more memories storing instructions; and
   one or more processors that are coupled to the one or more memories and,
      when executing the instructions, are configured to perform the steps of:
      identifying a plurality of command sequences stored in a database based on a current command being interacted with in a graphical user interface;
      computing a score for each command sequence included in the plurality of command sequences based on one or more commands included in the command sequence and one or more commands included in a command history;
      determining at least one command sequence included in the plurality of command sequences to output based on the scores; and
      outputting the at least one command sequence for display.

* * * * *

UNITED STATES PATENT AND TRADEMARK OFFICE
CERTIFICATE OF CORRECTION

PATENT NO. : 11,966,293 B2
APPLICATION NO. : 17/965718
DATED : April 23, 2024
INVENTOR(S) : Damien Paul Andre Masson et al.

Page 1 of 1

It is certified that error appears in the above-identified patent and that said Letters Patent is hereby corrected as shown below:

On the Title Page

(56) References Cited:
Please delete "Afreniere et al., "These Aren't the Commands You're Looking For: Addressing False Feedforward in Feature-Rich Software", In Proceedings of the 28th Annual ACM Symposium on User Interface Software & Technology, https://doi.org/10.1145/2807442.2807482, Nov. 8-11, 2015, pp. 619-628." and insert --Lafreniere et al., "These Aren't the Commands You're Looking For: Addressing False Feedforward in Feature-Rich Software", In Proceedings of the 28th Annual ACM Symposium on User Interface Software & Technology, https://doi.org/10.1145/2807442.2807482, Nov. 8-11, 2015, pp. 619-628.--.

Signed and Sealed this
Eighteenth Day of June, 2024

Katherine Kelly Vidal
*Director of the United States Patent and Trademark Office*